(12) United States Patent
Endo et al.

(10) Patent No.: US 7,474,276 B2
(45) Date of Patent: Jan. 6, 2009

(54) DISPLAY SYSTEM AND MICRODISPLAY APPARATUS

(75) Inventors: Taro Endo, Kawasaki (JP); Nobuo Miyairi, Kanagawa (JP); Takanori Ishizawa, Tachikawa (JP); Ryotaro Hanayama, Sagamihara (JP); Seiji Nakashima, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 703 days.

(21) Appl. No.: 09/911,673

(22) Filed: Jul. 24, 2001

(65) Prior Publication Data

US 2002/0113907 A1 Aug. 22, 2002

(30) Foreign Application Priority Data

| Jul. 27, 2000 | (JP) | ............................. 2000-227506 |
| Jul. 27, 2000 | (JP) | ............................. 2000-227507 |
| Nov. 8, 2000 | (JP) | ............................. 2000-340804 |

(51) Int. Cl.
*G09G 5/00* (2006.01)
(52) U.S. Cl. .................................. 345/7; 345/8; 345/9
(58) Field of Classification Search ................ 345/7–9, 345/211–214; 348/115, 569, 563, 565; 702/63; 700/17, 83; 340/636, 531
See application file for complete search history.

(56) References Cited

U.S. PATENT DOCUMENTS

| 4,929,931 A | * | 5/1990 | McCuen ................ 340/636.15 |
| 5,630,043 A | * | 5/1997 | Uhlin ......................... 345/474 |
| 5,675,364 A | * | 10/1997 | Stedman et al. ............. 345/211 |
| 5,963,010 A | * | 10/1999 | Hayashi et al. ............. 320/106 |
| 5,991,085 A | * | 11/1999 | Rallison et al. ............. 359/630 |
| 6,050,717 A | * | 4/2000 | Kosugi et al. ................. 700/17 |
| 6,295,002 B1 | * | 9/2001 | Fukuda .................... 340/636.1 |
| 6,297,797 B1 | * | 10/2001 | Takeuchi et al. ............ 345/467 |
| 6,314,479 B1 | * | 11/2001 | Frederick et al. ............... 710/63 |
| 6,473,058 B1 | * | 10/2002 | Hotomi et al. ................ 345/1.1 |
| 6,590,597 B1 | * | 7/2003 | Kim ........................... 345/866 |
| 6,845,277 B1 | * | 1/2005 | Michelet et al. ............... 700/83 |

FOREIGN PATENT DOCUMENTS

| EP | 0 961 504 A2 | 12/1999 |
| JP | 05-066853 | 3/1993 |

(Continued)

OTHER PUBLICATIONS

Summary: DPMS & DDC Standard by Kazuya MIne, "Interface" vol. 21, No. 10, p. 144-148, Oct. 1995, and English language summary thereof.

*Primary Examiner*—Kevin M Nguyen
(74) *Attorney, Agent, or Firm*—Frishauf, Holtz, Goodman & Chick, P.C.

(57) ABSTRACT

A display system includes a host apparatus having a video interface circuit and a display apparatus operated by feed of a video image and power from the host apparatus, and also has a communication function for receiving and transmitting data between the host apparatus and the display apparatus. In the display system, the display apparatus transmits power consumption data thereof stored in an EEPROM to the host apparatus and processes the power consumption data thereof which is received by the host apparatus, thus controlling power of the display system including the host apparatus and the display apparatus.

16 Claims, 22 Drawing Sheets

FOREIGN PATENT DOCUMENTS

| | | |
|---|---|---|
| JP | 9-311670 A | 12/1997 |
| JP | 09-326977 | 12/1997 |
| JP | 10-74072 A | 3/1998 |
| JP | 10-301547 | 11/1998 |
| JP | 11-15425 A | 1/1999 |
| JP | 2000-020017 | 1/2000 |
| JP | 2000-032388 | 1/2000 |

* cited by examiner

207a

ID
DISPLAY SYSTEM AND MICRODISPLAY APPARATUS

This application claims the benefit of Japanese Application No. 2000-227507 filed in Japan on Jul. 27, 2000, Japanese Application No. 2000-227506 filed in Japan on Jul. 27, 2000, and Japanese Application No. 2000-340804 filed in Japan on Nov. 8, 2000, and includes the subject matter of Japanese Application No. 2000-184302 filed in Japan on Jun. 20, 2000, the contents of all of which are incorporated herein by reference.

BACKGROUND OF THE INVENTION

1. Field of the Invention

The present invention relates to a display system and a microdisplay apparatus, and more particularly, to a display system and a microdisplay apparatus suitable for data communication via a display interface capable of plug and play.

2. Description of the Related Art

There is an interface conformed with DDC1/DDC2B/DDC2AB standard which is prescribed by VESA (Video Electronics Standards Association) as means for communication between a personal computer and a display apparatus. Further, there is EDID (Extended Display Identification Data Standard) as a data format on which specific information of the display apparatus is recognized by the personal computer by using the communication via the above interface.

In an example of the above-mentioned communication, as disclosed in Japanese Unexamined Patent Application Publication No. 10-74072, there is provided a display apparatus, connected to a computer main body, for displaying data of a computer main body on a monitor, having a monitor control unit for display control with a CPU and a RAM and a nonvolatile memory connected to the monitor control unit, wherein the nonvolatile memory has an area for storing monitor specification data necessary for set-up of display and the RAM has an area for downloading the monitor specification data when the computer main body is turned on or is reset, and the monitor specification data downloaded is transferred to the computer main body in accordance with a reading request from the computer main body.

Recently, portable-type personal computers are increasingly developed and many companies unveil small personal computers which operate with a battery and integrate no display apparatus. The small personal computers are well known as, a so-called wearable computers. As one of the display apparatuses in the wearable computers, there is a portable-type microdisplay apparatus or wearable display apparatus developed having a small display (display having a diagonal length of a screen of, for example, 50 mm or less). An unveiled concrete case is a monocular-type head mounted video display apparatus using a digital video interface. In the wearable computer system, the microdisplay apparatus is mounted on the head or face, a wearable computer is equipped, and the microdisplay apparatus and wearable computer are connected, thereby using the system.

The display interface of some of these microdisplay apparatus adopts a signal format of GVIF, TMDS, or LVDS. The microdisplay apparatus using the signal formats is specified to greatly reduce power consumption, as compared with general display apparatuses. Specifically speaking, the power consumption is, for example, approximately 5V and 0.5 A. Therefore, even when a host apparatus is portable-type information equipment driven with the battery as mentioned above (e.g., a notebook-type personal computer and a wearable personal computer), power can be supplied from the host apparatus.

Currently, companies sell portable-type DVD players. In addition, as unveiled ones, there is a portable-type DVD player in which a dedicated output terminal for supplying a video signal and power via a dedicated connection cable is provided for a commercial head mounted video display apparatus.

By using the video interface of the DVD player, a plurality of kinds of display apparatuses can be exchanged and employed.

In recent years, because of difficult setting in that peripheral equipment is connected to a computer as the host apparatus, a plug and play mechanism is integrated in the computer system or the like to facilitate the setting. In the plug and play mechanism, only by plugging the peripheral equipment in, for instance, a personal computer, the computer can readily play.

The plug and play is structured by a BIOS corresponding to the plug and play and an OS (operating system) corresponding to it. For example, the plug and play mechanism enables the automation of troublesome setting of the system such as setting of interrupt of expansion board (IRQ), DMA channel, I/O address, etc. and also enables a device driver of a peripheral equipment to be automatically loaded/unloaded when the peripheral equipment are attached to or detached from the personal computer during operation thereof.

The display apparatus having the above-described plug and play mechanism (function) is produced. Data of the display apparatus such as a resolution and a synchronous frequency is received/transmitted between the computer and the plug and play mechanism of the display apparatus, thereby effecting the plug and play mechanism.

In the above-described plug and play mechanism of the display, control for communication is performed through a DDC (Display Data Channel) interface which is standardized by the VESA. Also, by transmitting EDID (Extended Display Identification Data) information on the resolution and the synchronous frequency of the display apparatus, etc. from the display apparatus to the computer, the setting can be automatized to recognize an available range of the display apparatus. On the other hand, the plug and play needs complicated operations of start, selection, and execution of application.

The improvement in the operability is, for instance, a display apparatus disclosed in Japanese Unexamined Patent Application Publication No. 11-15425. The display apparatus has a function for switching a display mode of a computer under the control of an operation for switching a resolution and a synchronous frequency by the display apparatus itself so as to improve the operability. The disclosure exemplifies a case in which the computer is connected to the display apparatus with one-to-one corresponding relationship, that is, the single display apparatus is connected to the computer.

As general display apparatuses, there are a CRT display used for a desk-top computer and a liquid crystal display used for the liquid crystal desk-top computer. However, power consumption is large in these displays. Therefore, general types are a display integrating an AC power supply and a display to which DC power is supplied via an AC adapter. In the plug and play of the above-mentioned display apparatus, the improvement is limited to the automatization of setting of the resolution and synchronous frequency of the display apparatus. A digital interface of the display apparatus is disclosed in Japanese Patent Unexamined Publication No.

9-311670 as one example. In the interface disclosed therein, however, there is neither suggestion nor consideration of power control.

Since the above application is typical, it is necessary to supply a power supply of the display apparatus from the AC power or from the AC adapter near the installed place of the display apparatus when using the display apparatus at a position far from the host apparatus.

Also, since the above-mentioned wearable computer system is developed in terms of connection of a dedicated display apparatus, it is not assumed that microdisplay apparatuses having various specifications are exchanged and connected. Thus, the plug and play is not considered.

In recent years, in association with the active technical development in the field of the microdisplay apparatus, a technique for connecting pieces of equipment for general purpose must be taken into account.

However, it is difficult to implement the plug and play connection via a shared interface between the host apparatus and the display apparatus to which a video signal and power are supplied from the host apparatus because of the following reasons.

Firstly, in the standard specification of the above EDID, there is no item on power consumption of the display apparatus to be connected and data on the power consumption is not supported. Consequently, in the case of supplying power to the display apparatus from the host apparatus, even if no power consumption of the display apparatus connected to the host apparatus corresponds to the power capacity of the host apparatus, there is a possibility that the host apparatus feeds power.

Next, according to the aforementioned technique, power can be controlled by storing a power consumption data file of the existing display apparatus in the host apparatus, then, by recognizing the display apparatus connected to the host apparatus in accordance with the EDID, and by referring to the corresponding data file. However, even in this case, it is not possible to control the power for the display apparatus in which, beforehand, the data file is not provided in the host apparatus.

Further, in a display system in which a HOST APPARATUS is driven with a battery and a video signal and power are supplied to a display apparatus from the HOST APPARATUS, the HOST APPARATUS has no power consumption data of the display apparatus connected thereto. Therefore, it is impossible to correctly recognize available time of the host apparatus and the display apparatus corresponding to a residual amount of battery power in the host apparatus and, then, the available time cannot also be correctly indicated to a user.

In some face mounted display (FMD) system as a product, a controller for manual operation lies between a host apparatus as a supply source of a video image and a goggle as a display apparatus mounted on the head upon using. However, for the purpose of conveniently carrying the FMD system, the high portability is desired for applications such as the wearable personal computer PC (Personal Computer) and, thus, the configuration needs to be simplified as much as possible.

It is considered that, in place of independent installation of the controller, the host apparatus or goggle has a function of the controller and only the goggle is directly connected to the host apparatus.

However, the controller has an on-screen display (OSD) function for displaying information on a product (such as the residual amount of battery power and a screen of a password) on a screen for the user who mounts the goggle on the head. In one example of the OSD function, if the goggle entirely has this function, the goggle increases in size and the user cannot comfortably mount it on the head.

As another example of the OSD function, there is a password function for setting the goggle to be connected to a personal computer. Originally, the goggle has a password as unique information. In the case in which the password function is provided for the host apparatus, a specific goggle is connected to a specific host apparatus with one-to-one corresponding relationship and the availability is limited, thus prohibiting the general-purpose use. In conclusion, it is not preferable to provide the password function for the host apparatus.

As described above, further, the existing display systems such as the FMD system need improvement of the portability and have a problem in that the goggle is increased in size and cannot be wearablly used if the controller is not provided to accomplish the above necessary improvement without any devices.

As one of the display systems, a power-down converter and power-up converter are provided for the microdisplay apparatus and a power supply of the power-up/down converters is controlled by the microdisplay apparatus itself and the operation thereof is made stable. In this case, most often, power consumption of the power-up/down converter is large and the weight thereof is heavy.

Preferably, the display apparatus is formed by enclosing the power supply in one cable so that the portability is high and it is easily used for an operator. Although the digitization of a video signal enables long-distance communication, it must be taken into account that a voltage of a power supply drops in accordance with a length of a cable when a line for transmitting the video signal and a line for supplying power is shared. Consequently, if the host apparatus is detached/attached from/to the operator in consideration of the above points, it is desired that the microdisplay apparatus can be operated wearablly and stably.

No apparatus for displaying data on a screen by connecting a plurality of equipment is disclosed in the Japanese Unexamined Patent Application Publication No. 11-15425. More specifically, if the computer is connected to the display apparatus via a conversion adapter, etc. arranged between them, the plug and play may become ineffective. Such problem is not taken into account therein. In the plug and play, only a point is considered that the microdisplay apparatus is directly communicated with the computer, thereby receiving and transmitting data. Therefore, the above plug and play is not effective to a system for converting a format of the video signal by the conversion adapter and displaying the signal on the microdisplay apparatus.

SUMMARY OF THE INVENTION

It is an object of the present invention to prevent a trouble such as system down due to the shortage of the capacity of a host apparatus to supply power to a display apparatus which functions with a video signal and power being supplied from the host apparatus.

Also, it is another object of the present invention to provide a display system in which, between a host apparatus driven with a battery and a display apparatus functioned by feed of a video signal and power from the host apparatus, it is possible to control power of the host apparatus, indicate the residual amount of battery power to a user, and alarm the shortage of the residual amount of the battery power and the necessities of replacement of battery and power input means, etc.

Further, it is still another object of the present invention to provide a display apparatus including a host apparatus and a display apparatus which is functioned by feed of a video signal and power from the host apparatus, in which an interface is made using a single connection cable to embody the environment under plug and play which is independent of a specific display apparatus in a system.

In addition, it is still another object of the present invention to provide a display system including a host apparatus and a display apparatus which are simply connected not through a controller, in which on-screen display information can be properly displayed corresponding to types of connected apparatuses without impairing the nature of compact size and reduced weight of the display apparatus.

In addition, it is still another object of the present invention to provide a microdisplay apparatus capable of stable operation in general-purpose use, in which at least a power line and a signal line from a host apparatus can be connected via a single cable, and a display system using this microdisplay apparatus.

Briefly speaking, according to a first aspect of the present invention, a display system comprises: a host apparatus having an image output interface; a display apparatus which is operated by supply of a video signal and power from the host apparatus; and a communication function for receiving and transmitting data between the host apparatus and the display apparatus, wherein the host apparatus comprising a storing unit for storing power consumption data thereof, and the display apparatus transmits the power consumption data thereof stored in said storing unit to the host apparatus to the host apparatus and the host apparatus processes the received power consumption data, thereby performing power control of the display system comprising the host apparatus and the display apparatus.

According to a second aspect of the present invention, a display system comprises: a host apparatus having an image output interface; a display apparatus which is operated by supply of at least one of a video signal and power from the host apparatus; and a communication function for receiving and transmitting data between the host apparatus and the display apparatus, wherein the display apparatus comprises a storing unit for storing power consumption data thereof and display-side communication means for transmitting the power consumption data stored in the storing unit, and the host apparatus comprises host-side communication means for receiving the power consumption data transmitted from the display apparatus and power control means for entirely performing power control of the display system based on the power consumption data received from the host-side communication means.

According to a third aspect of the present invention, a display system comprises: a host apparatus having an image output interface; a display apparatus which is operated by receiving at least a vide signal from the host apparatus; and a communication function for receiving and transmitting data between the host apparatus and the display apparatus, and wherein the display apparatus comprises storing means for storing on-screen display information and display-side communication means for transmitting data which is stored in the storing means, the host apparatus comprises host-side communication means for receiving the on-screen display information transmitted by the display apparatus and information superimposing means for superimposing the on-screen display information received from the host-side communication means to the video signal, and in the display system, the host-side communication means transmits the video signal superimposed to the on-screen display information and the display-side communication means receives the transmitted signal, thus, the display apparatus displays an image of the on-screen display information.

According to a fourth aspect of the present invention, a microdisplay apparatus connected to a host apparatus, comprises: memory means for storing monitor request voltage information and monitor current consumption information as specific EDID information on the microdisplay apparatus; and communication interface means for communication with the host apparatus so as to transmit the monitor request voltage information and the monitor current consumption information to the host apparatus.

According to a fifth aspect of the present invention, a display system including a host apparatus and a microdisplay apparatus having memory means for storing monitor request voltage information and monitor current consumption information as specific EDID information on the microdisplay apparatus, and communication interface means for communication with the host apparatus to transmit the monitor request voltage information and the monitor current consumption information to the host apparatus, in which the host apparatus is connected to the microdisplay apparatus via a digital interface, wherein the microdisplay apparatus further comprises detecting means for detecting a power voltage and a power current consumption, and transmits values of the power voltage and the power current consumption detected by the detecting means to the host apparatus via the communication interface means, and the host apparatus comprises control means for controlling an output voltage of the host apparatus based on the EDID information obtained when being connected to the microdisplay apparatus and the detected values of the power voltage and power current consumption.

These objects and advantages of the present invention will become further apparent from the following detailed explanation.

DESCRIPTION OF THE PREFERRED EMBODIMENTS

Hereinbelow, embodiments of the present invention will be described with reference to the drawings.

Figure 1:
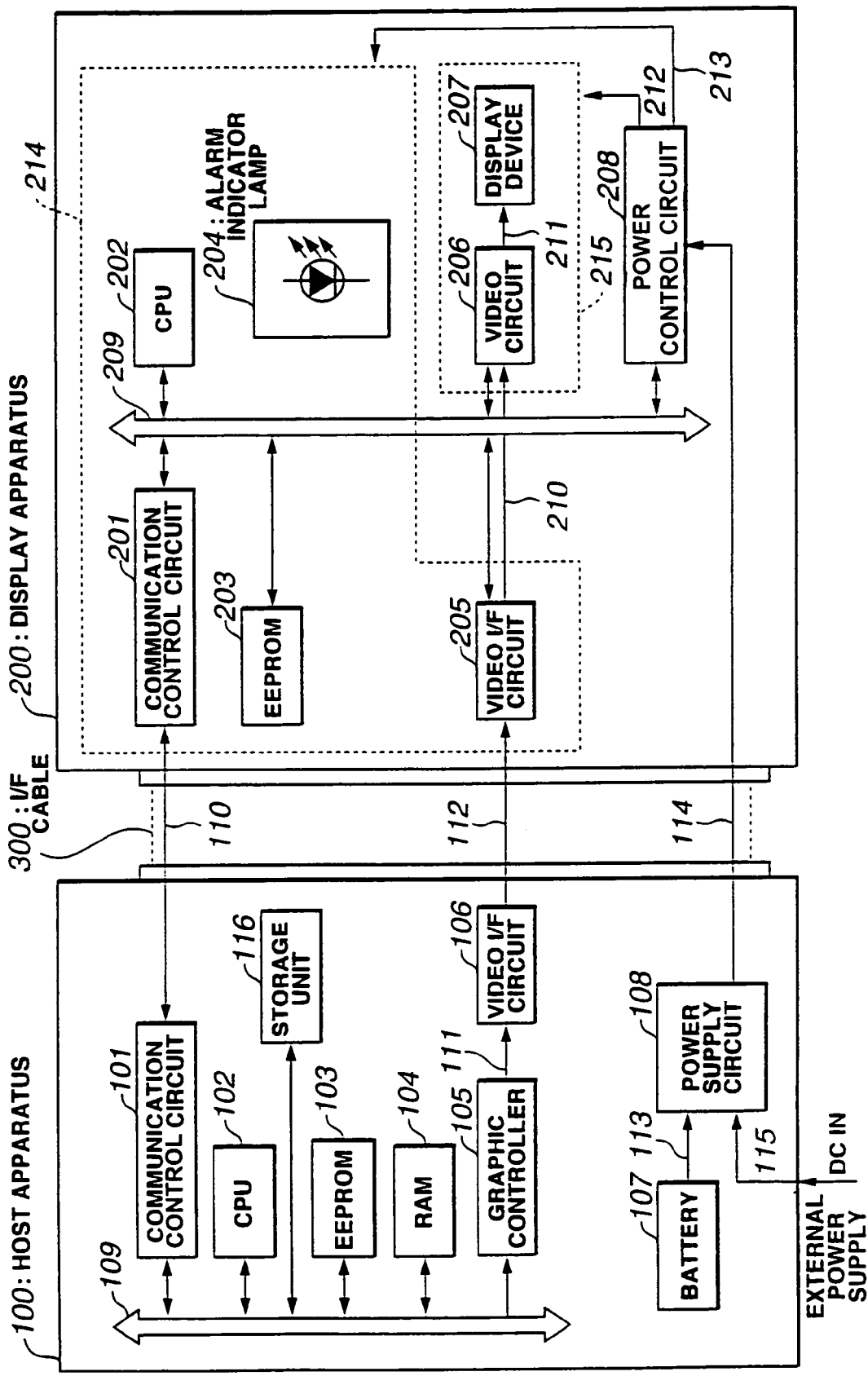
FIG. 1 is a block diagram schematically showing a display system in which a host apparatus and a display apparatus are connected via a display interface according to a first embodiment of the present invention.
Figure 2:
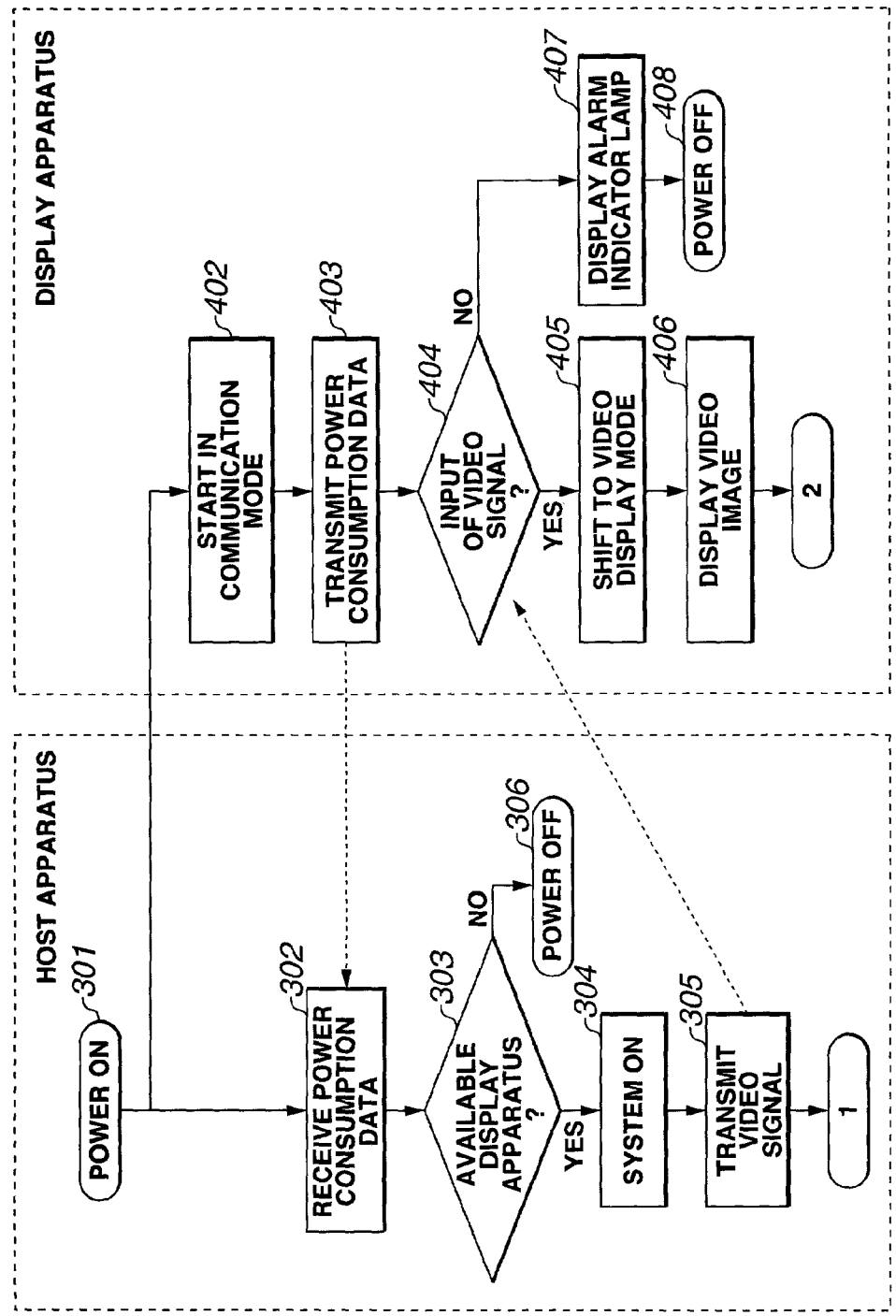
FIG. 2 is a flowchart showing one example of a process for starting the display system according to the first embodiment.
Figure 3:
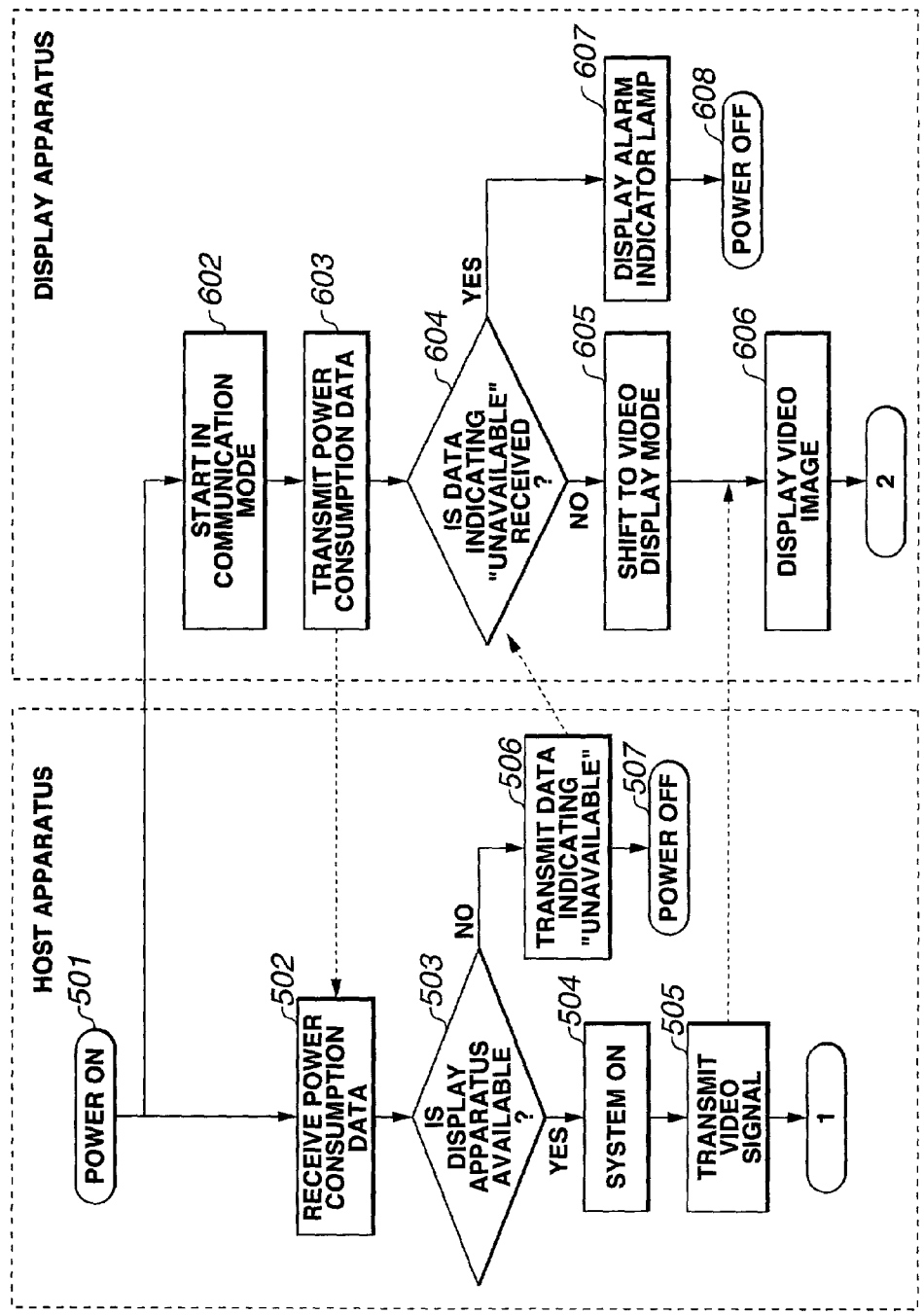
FIG. 3 is a flowchart showing another example of the process for starting the display system according to the first embodiment.
Figure 4:
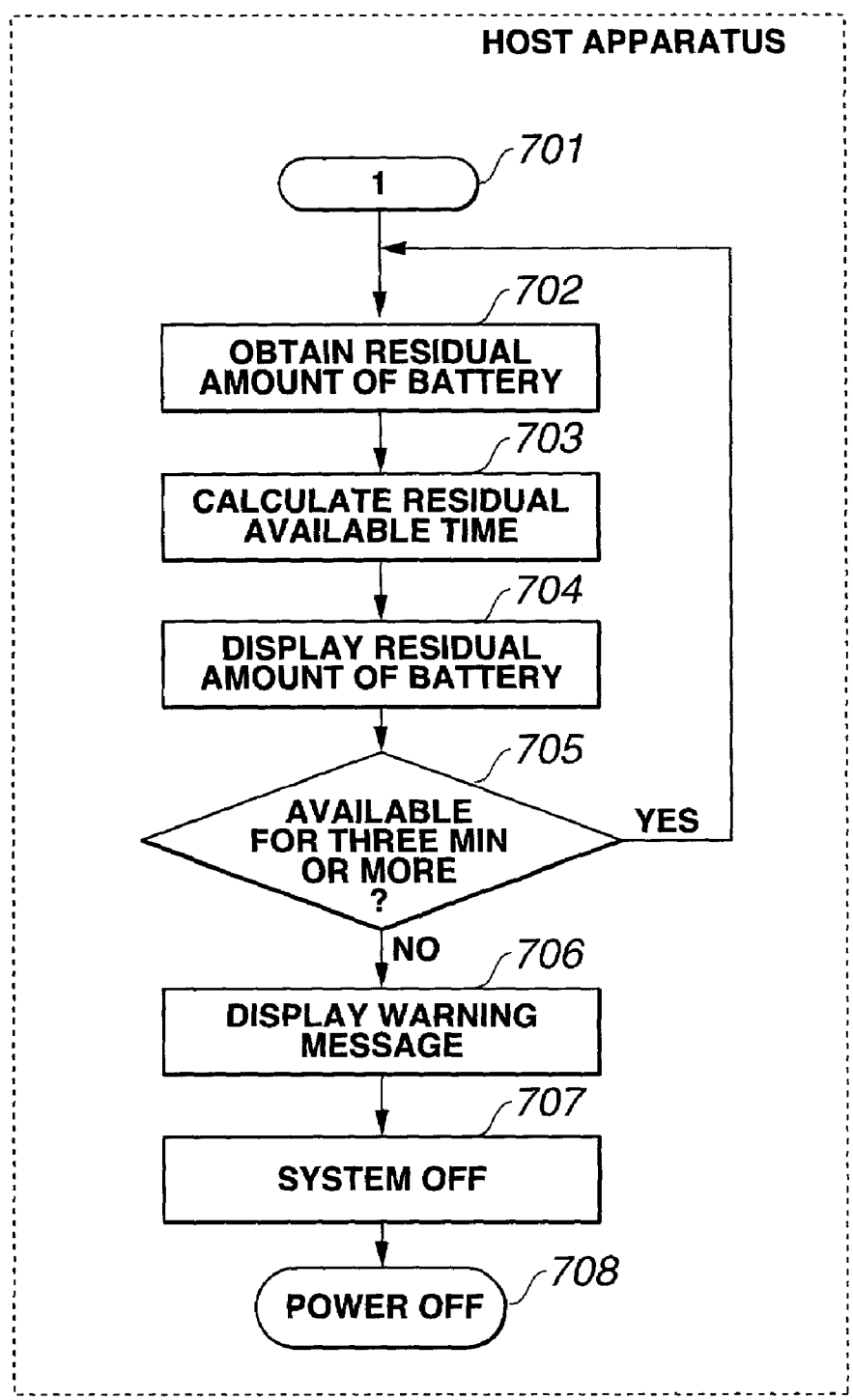
FIG. 4 is a flowchart showing a process for power control in the host apparatus according to the first embodiment.
Figure 5A:
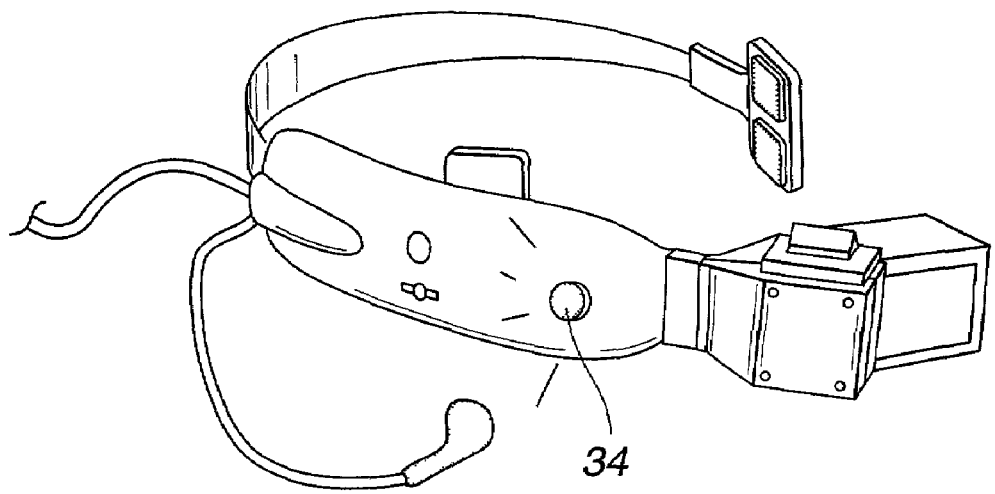
FIGS. 5A and 5B are diagrams showing examples in which an alarm indicator lamp is mounted on a head mounted type display apparatus according to the first embodiment.
Figure 5B:
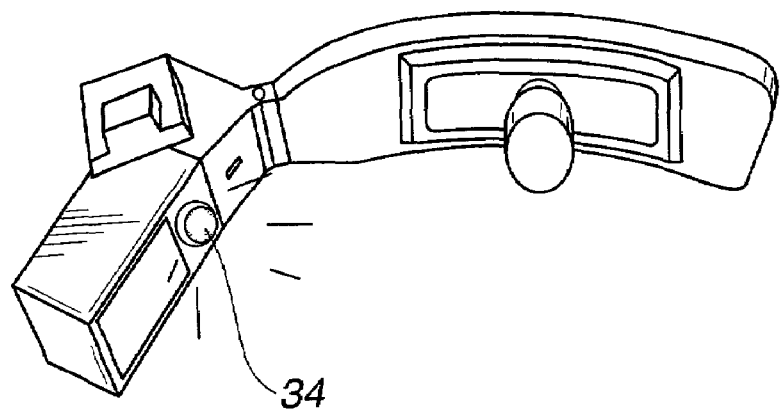
Figure 6A:
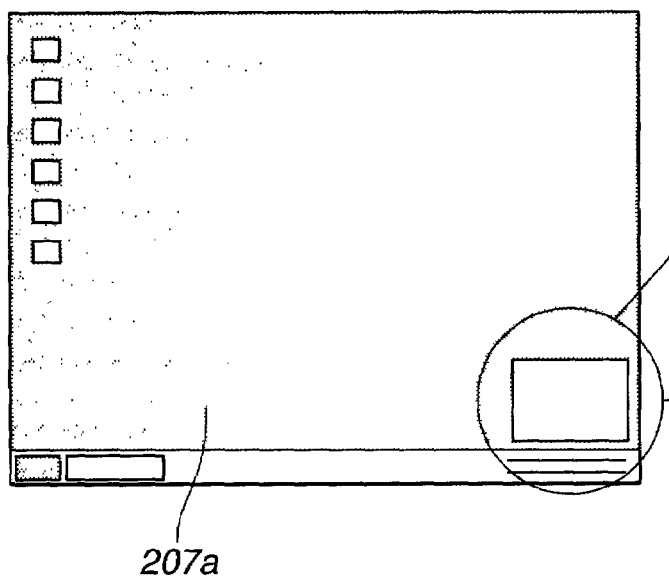
FIGS. 6A to 6C are diagrams showing display examples of the residual amount of battery power and battery available time in a display screen according to the first embodiment.
Figure 6B:
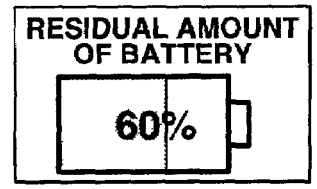
Figure 6C:
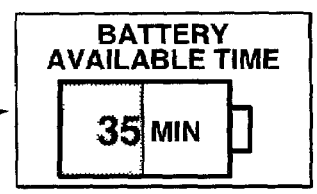
Figure 7:
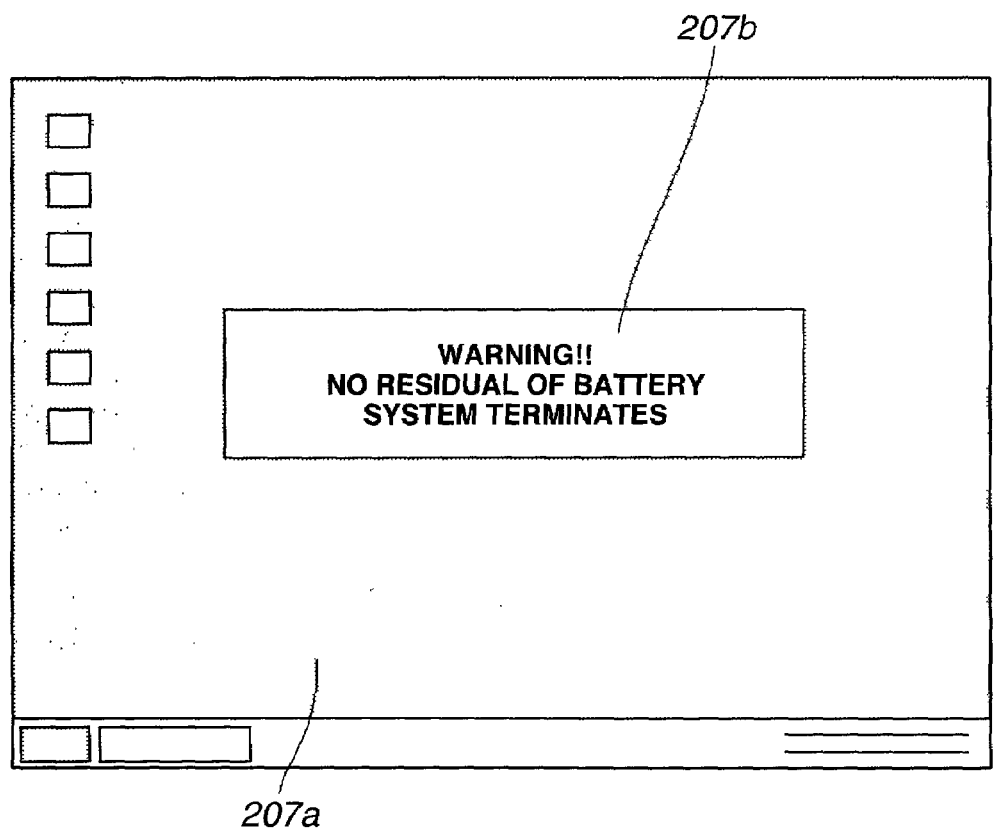
FIG. 7 is a diagram showing a display example of a warning message in accordance with an instruction from the host apparatus according to the first embodiment.
Figure 8:
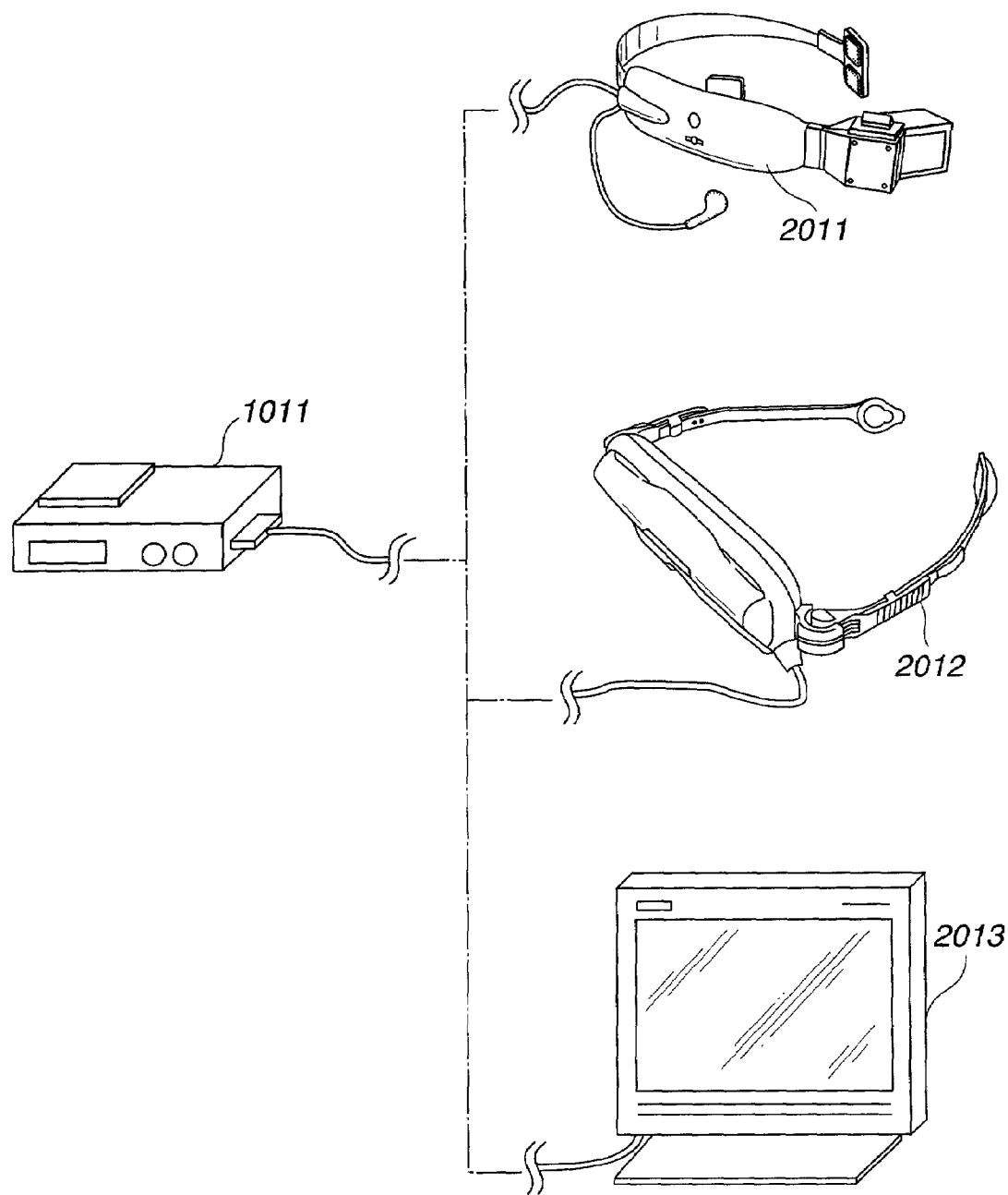
FIG. 8 is a diagram showing an example in which a plurality of display apparatuses are connected to a portable-type personal computer according to the first embodiment.
Figure 9:
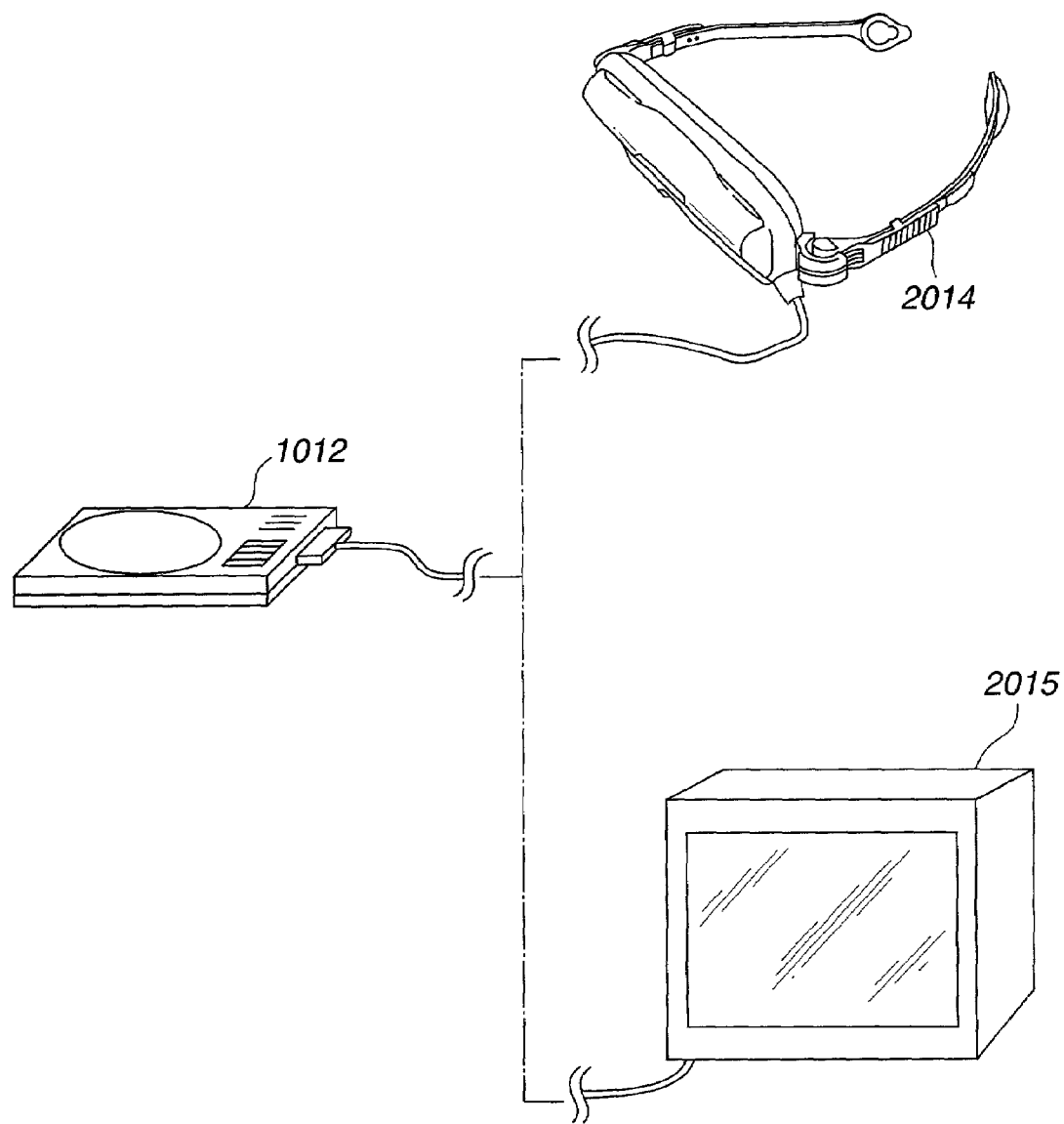
FIG. 9 is a diagram showing an example in which a plurality of display apparatuses are connected to portable-type DVD player according to the first embodiment.

FIGS. 1 to 9 show a first embodiment of the present invention, wherein FIG. 1 is a block diagram schematically showing a display system in which a host apparatus and a display apparatus are connected via a display interface, FIG. 2 is a flowchart showing one example of a process for starting the display system, FIG. 3 is a flowchart showing another example of the process for starting the display system, FIG. 4 is a flowchart showing a process for power control in the host apparatus, FIGS. 5A and 5B are diagrams showing examples in which an alarm indicator lamp is mounted on a head mounted type display apparatus, FIGS. 6A to 6C are diagrams showing display examples of the residual amount of battery power and battery available time, FIG. 7 is a diagram showing a display example of a warning message in accordance with an instruction from the host apparatus, FIG. 8 is a diagram showing an example in which a plurality display apparatuses are connected to a portable-type personal computer, and FIG. 9 is a diagram showing an example in which a plurality of display apparatuses are connected to a portable-type DVD player.

Referring to FIG. 1, a host apparatus 100, having an interface for image output, comprises: a communication control circuit 101; a CPU 102 as control means; a storage unit 116 for storing a video image and a system file; an EEPROM 103; a RAM 104; a graphic controller 105; a video interface circuit 106 for converting a video signal inputted from the graphic controller 105 via a bus 111 into one of a general-purpose external interface format; a battery 107; and a power supply circuit 108.

Thereamong, connected to the CPU 102 via a system bus 109 and controlled by the CPU 102 on a microcomputer are the communication control circuit 101; storage unit 116; EEPROM 103; RAM 104; and graphic controller 105.

The power supply circuit 108 receives a power supply 113 from the battery 107 as mentioned above and also a power supply 115 such as a DC supply from the outside. Thus, the power supply circuit 108 has a plurality of power supplies. The battery 107 is not necessarily fixed to the host apparatus 100 but may be attachable/detachable to/from the host apparatus 100.

The display apparatus 200 for displaying a video image by using an inputted video signal comprises: a communication control circuit 201 as communication interface means; a CPU 202; an EEPROM 203; an alarm indicator lamp 204; a video interface circuit 205; a video circuit 206; a display device 207; and a power control circuit 208.

Thereamong, connected to the CPU 202 via a system bus 209 and controlled by the CPU 202 on a microcomputer are the communication control circuit 201, EEPROM 203; video interface circuit 205; video circuit 206; and power control circuit 208.

The communication control circuit 201 is connected to the communication control circuit 101 in the host apparatus 100 via a bus 110, thereby communicating data. An interface specification of the communication control circuit 201 is compliant with, for example, DDC1/DDC2B/DDC2AB standard prescribed by the VESA or one with an extension function.

The video interface circuit 205 receives a video signal from the video interface circuit 106 in the host apparatus 100 via a bus 112, and outputs the video signal to the video circuit 206 via a bus 210.

The video signal for display processed by the video circuit 206 is inputted to the display device 207 via a bus 211, thereby displaying the video image.

The power control circuit 208 receives power from the power supply circuit 108 in the host apparatus 100 via a bus 114, feeds received power to a circuit block 215 via a power line 212, and further supplies the power to a circuit block 214 via a power line 213.

An I/F (interface) cable 300 as the display interface is comprised of the buses 110, 112, and 114 as one cable wire, and has a connector and a signal pin alignment which are shared with the display apparatus.

The display apparatus 200 has two operation modes. In a "communication mode" (mode only for a communication function) as one operation mode, it can communicate with the host apparatus 100 by operating only the power control circuit 208 and the circuit block 214 and, however, it cannot display the video image. In a "video display mode" as the other operation mode, further, the circuit block 215 is operated in the communication mode and, thereby, the display apparatus 200 displays the video image on the display device 207.

A description is given of one example of the process for starting the display system having the above configuration therein with reference to FIG. 2.

First, the host apparatus 100 is turned on (step 301).

After turn-on, the host apparatus 100 starts the display apparatus 200 in the "communication mode" (step 402). Thus, the CPU 202 controls a microcomputer, reads, via the system bus 209, a device ID and power consumption data stored in the EEPROM 203, and transmits the read data to the host apparatus 100 via the communication control circuit 201 and the bus 110 (step 403).

In the host apparatus 100, the communication control circuit 101 receives the power consumption data from the display apparatus 200 (step 302), and determines, based on the received data, whether or not power necessary for display operation of the display apparatus 200 can be supplied (step S303).

If the host apparatus 100 determines that the power can be supplied to the display apparatus 200 in step 303, the display system starts (step 304). Then, the transmission of the video data from the video interface circuit 106 starts (step 305).

If the host apparatus 100 determines that the power cannot be supplied to the display apparatus 200 in step 303, the power supply of the host apparatus 100 is turned off without transmission of the video signal data (step 306).

After transmitting the power consumption data in step 403, the display apparatus 200 monitors the video signal inputted to the video interface circuit 205 via the bus 112 for a predetermined period of time (step 404).

If the video signal is inputted in step 404, the circuit block 215 is operated, thereby shifting to the "video display mode" (step 405). The video image is displayed on the display device 207 (step 406).

On the other hand, if no video signal is inputted to the video interface circuit 205 after a predetermined period of time in step 404, the alarm indicator lamp 204 (corresponding to an alarm indicator lamp 34 shown in FIG. 5A or 5B) is switched on, thereby indicating the alarm to a user (step 407). Further, after a predetermined period of time, the power supply of the display apparatus 200 is turned off (step 408).

FIGS. 5A and 5B show examples in which the alarm indicator lamp 204 is mounted on the monocular-type head mounted type display apparatus, in which FIG. 5A shows an example of the arrangement of the alarm indicator lamp 34 outside an arm portion, and FIG. 5B shows an example of the arrangement of the alarm indicator lamp 34 near an observation window of a viewer portion.

Next, a description is given of the other example of the process for starting the display system having the above configuration with reference to FIG. 3.

First, the host apparatus 100 is turned on (step 501).

After turn-on, the host apparatus 100 starts the display apparatus 200 in the "communication mode" (step 602). Thus, the CPU 202 controls the microcomputer, reads, via the system bus 209, a device ID and power consumption data stored in the EEPROM 203, and transmits the read data to the host apparatus 100 via the communication control circuit 201 and the bus 110 (step 603).

In the host apparatus 100, the communication control circuit 101 receives the data from the display apparatus 200 (step 502), and determines, based on the received data, whether or not power necessary for display operation of the display apparatus 200 can be supplied (step S503).

If the host apparatus 100 determines that the power can be supplied to the display apparatus 200 in step 503, the display system starts (step 504). Then, the transmission of the video data from the video interface circuit 106 starts (step 505).

If the host apparatus 100 determines that the power cannot be supplied to the display apparatus 200 in step 503, data indicating "unavailable" is transmitted to the display apparatus 200 via the bus 110 without transmission of the video signal data (step 506). Sequentially to the transmission, after a predetermined period of time, the power supply of the host apparatus 100 is turned off (step 507).

After transmitting the power consumption data in step 603, the display apparatus 200 monitors the data signal inputted to the communication control circuit 201 via the bus 110 for a predetermined period of time (step 604).

If no data indicating "unavailable" is inputted after a predetermined period of time in step 604, the circuit block 215 is operated, thereby shifting to the "video display mode" (step 605). The video circuit 206 processes the video signal inputted to the video interface circuit 205 via the bus 112 and the video image is displayed on the display device 207 (step 606).

On the other hand, if the data indicating "unavailable" is inputted to the communication control circuit 201 after a predetermined period of time in step 604, the alarm indicator lamp 34 shown in FIGS. 5A or 5B (corresponding to the alarm indicator lamp 204 shown in FIG. 1) is switched on, thereby indicating the alarm to a user (step 607). Further, after a predetermined period of time, the power supply of the display apparatus 200 is turned off (step 608).

Next, a description is given of the process for power control in the host apparatus 100 when the host apparatus 100 receives power from the battery 107 with reference to FIG. 4.

The host apparatus 100 outputs the video signal from the host apparatus 100 as mentioned in the manner shown FIGS. 2 or 3 (step 701). Thereafter, the host apparatus 100 obtains data indicating the residual amount of battery power (step 702).

The available time corresponding to the residual amount of power is calculated based on the power consumption data of the host apparatus 100 and the power consumption data of the display apparatus 200 which has already been obtained from the display apparatus 200 (step 703).

The residual amount of battery power shown in FIG. 6B and the available time of the battery shown in FIG. 6C are displayed on a display screen 207a of the display apparatus 200 shown in FIG. 6A via the video signal (step 704).

The host apparatus 100 determines whether the available time calculated in step 703 is longer or shorter than a prescribed period of time (e.g., three minutes) (step 705). If the calculated available time is longer, the processing routine returns to step 702 whereupon the data of the residual amount of battery power is obtained again.

On the other hand, if the calculated available time is shorter than the prescribed period of time, the host apparatus 100 causes the display screen 207a in the display apparatus 200 to display a warning message 207b indicating system end due to the shortage of power (step 706). The display system ends (step 707), and the power supply is turned off (step 708).

Although the prescribed time is three minutes, obviously, the present invention is not limited to this and it may be, for example, a period of time required for storage of a file, or a period of time required for ensuring a time for announcing information in accordance with the communication control.

Next, a description is given of the example in which a plurality of display apparatuses are connected to the portable-type personal computer with reference to FIG. 8.

Referring to FIG. 8, the host apparatus 100 corresponds to a portable-type personal computer 1011. In accordance with user's apparatus, any of display apparatuses 2011 to 2013 is selected and connected, thereby using the portable-type personal computer 1011.

The display apparatus 2011 is a monocular-type HMD (head mounted type display) apparatus, and can display an image corresponding to a resolutions of VGA or SVGA. When the display apparatus 2011 is connected to the portable-type personal computer 1011, the video signal and power are fed from the portable-type personal computer 1011.

The display apparatus 2012 is a binocular-type HMD apparatus, and can display an image corresponding to a high resolution ranging SVGA to XGA. When the display apparatus 2012 is connected to the portable-type personal computer 1011, the video signal and power are fed from the portable-type personal computer 1011.

The display apparatus 2013 is a liquid crystal display apparatus having a size of a general desktop. When this display apparatus 2013 is connected to the portable-type personal computer 1011, the video signal is fed from the portable-type personal computer 1011. On the other hand, power is fed via a dedicated power supply cable which is connected to the display apparatus 2013. Since the display apparatus 2013 needs no feed of power from the portable-type personal computer 1011, data indicating null power consumption is transmitted to the portable-type personal computer 1011 as the host apparatus through communication.

Sequentially, a description is given of an example in which a plurality of display apparatuses are connected to a portable-type DVD player with reference to FIG. 9.

Referring to FIG. 9, the host apparatus is a portable-type DVD player 1012. In accordance with user's apparatus, any of display apparatuses 2014 and 2015 is selected and connected, thereby using the portable-type DVD player 1012.

The display apparatus 2014 is a binocular-type HMD apparatus, and can display a video signal based on, e.g., an NTSC system. When the display apparatus 2014 is connected to the portable-type DVD player 1012, the video signal and power are fed from the portable-type DVD player 1012.

The display apparatus 2015 is a general-type television and can display the vide signal based on the NTSC system, etc. When the display apparatus 2015 is connected to the portable-type DVD player 1012, the video signal is fed from the portable-type DVD player 1012. On the other hand, power is fed via a dedicated power supply cable which is connected to the display apparatus 2015. Since the display apparatus 2015 needs no feed of power from the portable-type DVD player 1012, data indicating null power consumption is transmitted to the portable-type DVD player 1012 as the host apparatus through communication.

According to the first embodiment, the interface can be shared between the host apparatus and the display apparatus which functions by feed of the video signal and power from the host apparatus irrespective of power feed condition, and the plug and play function can further be implemented.

Figure 10:
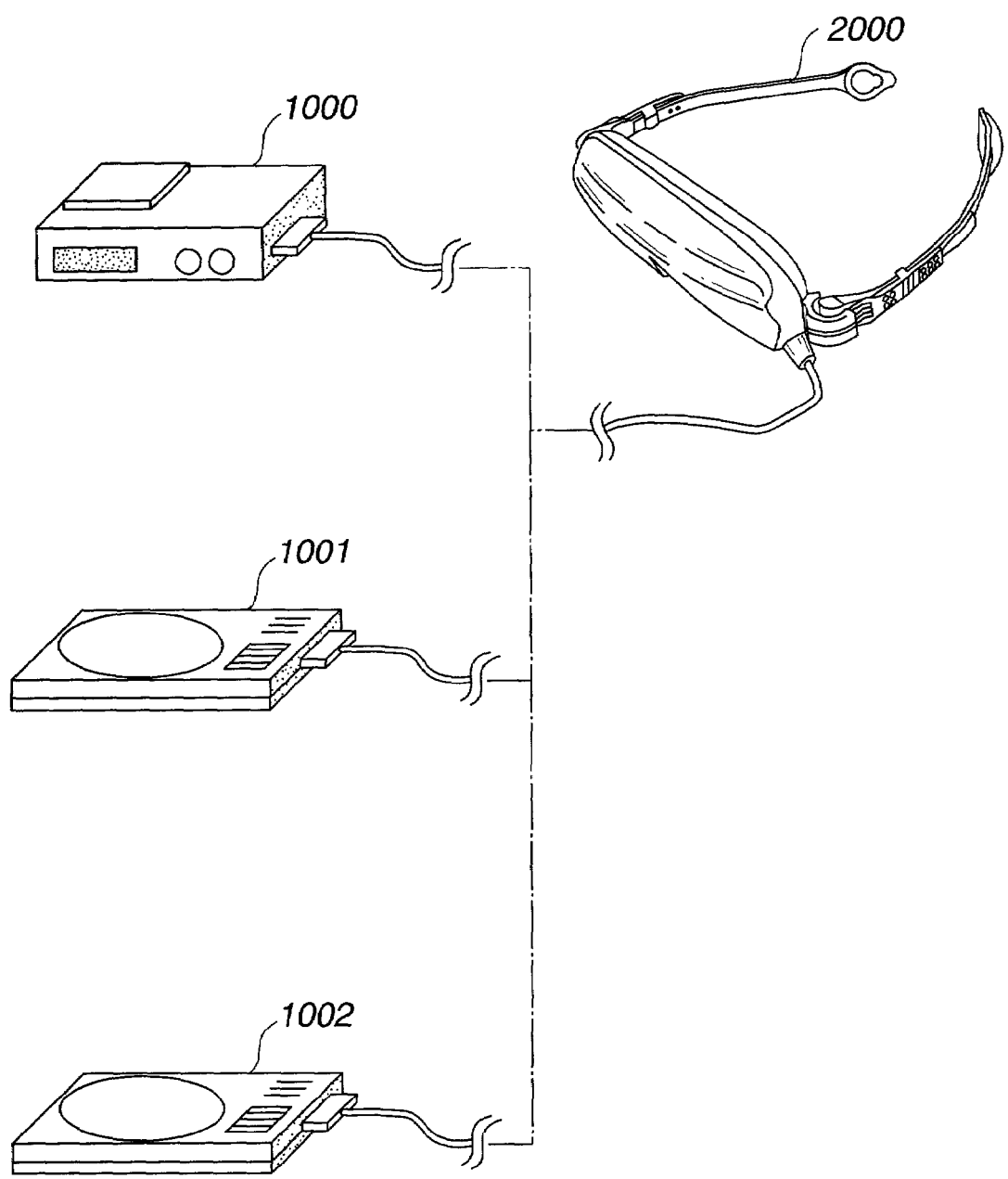
FIG. 10 is a diagram showing an example of the structure of a display system capable of selectively connecting a display apparatus to a plurality of types of host apparatuses according to a second embodiment of the present invention.
Figure 11:
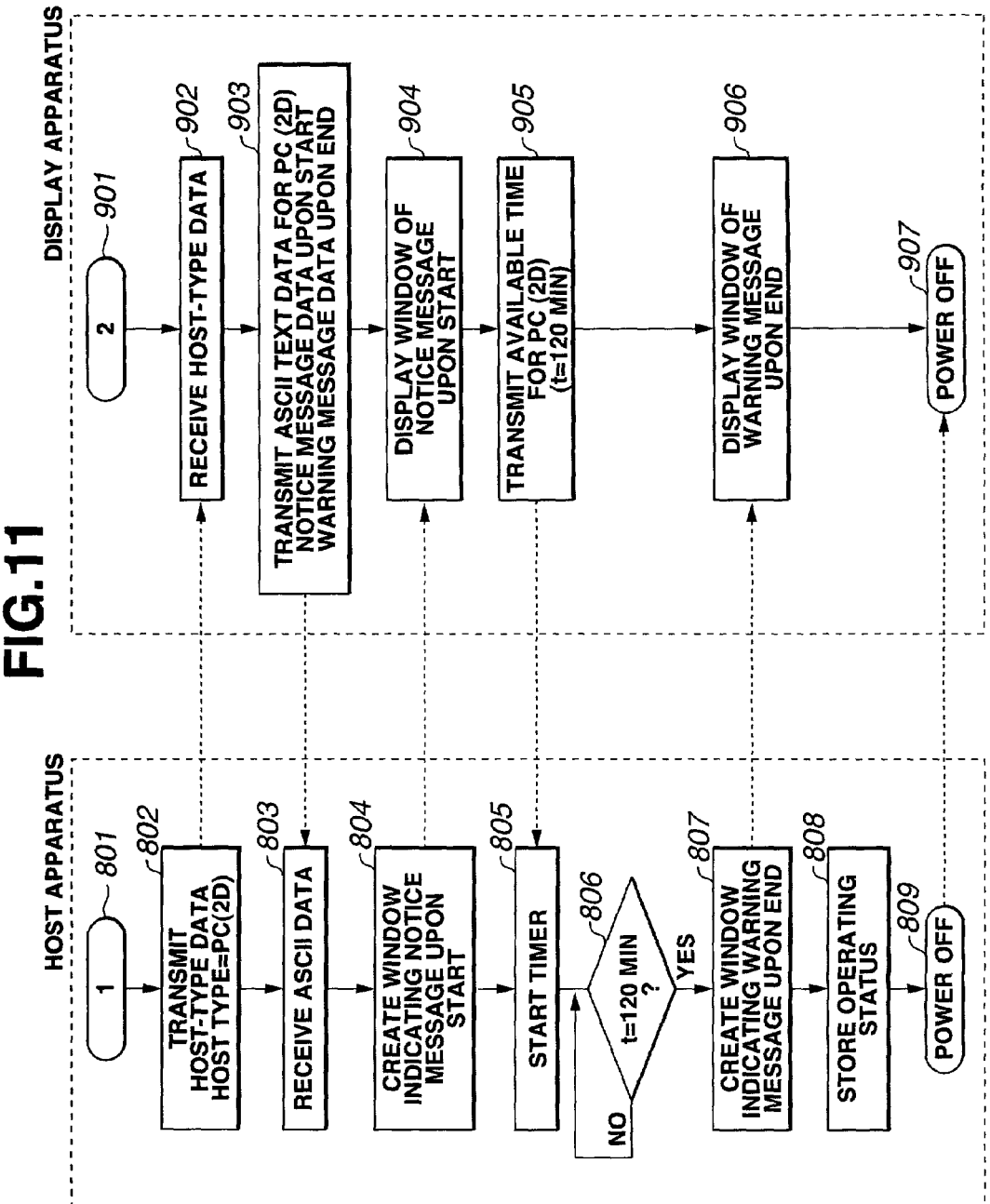
FIG. 11 is a flowchart showing a process between the host apparatus and the display apparatus according to the second embodiment.

FIGS. 10 and 11 show a second embodiment of the present invention, in which FIG. 10 is a diagram showing an example of the structure of a display system capable of selectively connecting a display apparatus to a plurality of types of host apparatuses, and FIG. 11 is a flowchart showing a process between the host apparatus and the display apparatus.

In the second embodiment, a description of the same portions as those of the first embodiment is omitted and only different portions are mainly described.

Referring to FIG. 10, a display apparatus 2000 as a microdisplay apparatus is selectively connected to a portable-type personal computer 1000 as the host apparatus, a portable-type DVD player 1001, a game machine 1002, or the like.

In the display system with the above configuration, in some cases, information to be displayed on an on-screen display is varied depending on connected equipment. For example, various information is to be displayed corresponding to the equipment when a continuous use time is limited and the limit time is to be displayed in the case of using the game machine 1002 for a three-dimensional image (3D video image), when end time of a movie is to be displayed in the case of using the portable-type DVD player 1001 for a two-dimensional video image (2D video image), when a continuous drive time is displayed in the case of using the portable-type personal computer 1000 driven with the battery, and the like. The information is not limited to the aforementioned information and is varied, for instance, alarm indicators corresponding to the password function and machine type, etc. are considered.

To cope with the various information, the display apparatus 2000 as the microdisplay apparatus has on-screen display (hereinafter, abbreviated to an OSD, as needed) information corresponding to a plurality of kinds of host apparatuses. When the display apparatus 2000 is connected to any of the above host apparatuses, it is checked to see if the plug and play is connected. Notice message data or end time data can be made different and displayed depending on the type of connected machine.

When the portable-type personal computer 100 is connected to the display apparatus 2000, the internal structure of the display system is substantially the same as that shown in FIG. 1 (that is, the portable-type personal computer 1000 and the display apparatus 2000 correspond to the host apparatus 100 and the display apparatus 200, respectively). By providing a RAM in the CPU 202 or connecting the RAM to system bus 209, character information, etc. can be stored as a target of the OSD.

In the structure, specifically, the on-screen display information consists of the character information (such as ASCII text data), image data, and the like, and is stored in the EEPROM 203 serving as storage means and a storage unit of the display apparatus 200 (display apparatus 2000).

Specific data stored as the on-screen display information is exemplified as follows.

(1) File type
  1: ASCII TEXT 2: JPEG Image 3: BMP Image (2) File name
  ASCII TEXT (3) Code corresponding to host type
  1: VIDEO (2D) 2: VIDEO (3D) 3: GAME (2D)
  4: GAME (3D) 5: PC (2D) 6: PC (3D) 7: other (4) display time
  1: start time 2: end time within limit 3: adjusting time 4: arbitrary time (display for 0 to 255 min in one min unit basis)

(5) Available limit time
  settable for 0 to 255 min in one min unit basis etc.

Next, a description is given of an operation of the display system when the display apparatus as the microdisplay apparatus is connected to the portable-type personal computer (portable-type PC) as the host apparatus with reference to FIG. 11.

Referring to FIG. 11, sequentially to step 305 in the flowchart of FIG. 2 or step 505 in the flowchart of FIG. 3, an operation in step 801 starts. Sequentially to step 406 in the flowchart of FIG. 2 or step 606 in the flowchart of FIG. 3, an operation in step 901 starts.

The host type data in the EEPROM 103 is read in accordance with an instruction of the CPU 102 as power control means of the host apparatus 100 comprising the portable-type PC. The read data is transmitted to the display apparatus 200 via the system bus 109 and the communication control circuit 101 as host-side communication means (step 802).

Since the host apparatus in this case is the portable-type PC and displays the 2D video image (i.e., two-dimensional video image), host-type PC (2D) data is transmitted.

On the other hand, the display apparatus 200 performs a process for receiving the host-type data.

More specifically, the host-type data is received by the communication control circuit 201 as display-side communication means. The received host-type data is stored in, for example, the RAM integrated in the CPU 202 via the system bus 209 (step 902).

The received host-type data is checked based on the instruction of the CPU 202. Read from the EEPROM 203 in the display apparatus 200 is an ASCII TEXT data (text data based on the ASCII code) set corresponding to the PC (2D) (two-dimensional image on the personal computer). The ASCII TEXT data set is transmitted via the system bus 209 and the communication control circuit 201 (step 903).

For example, notice message data upon start and warning message data upon end are examples of the transmitted ASCII TEXT data. Further, data indicating display timing, etc. is transmitted.

In the host apparatus 100, the text data is received by the communication control circuit 101 (step 803). Then, the received data is temporarily stored in the RAM 104. After that, the CPU 102 develops the received character into an image character and creates a window indicating the notice message upon start (step 804).

The formed window is transmitted to the display apparatus 200 via the graphic controller 105, video interface circuit 106, and the bus 112. In the display apparatus 200, the transmitted window is inputted from the video interface circuit 205 and the video circuit 206 displays the window on the display device 207 (step 904).

The display apparatus 200 transmits available time data for PC (2D) stored in the EEPROM 203 (for example, t=120 min) (step 905). The host apparatus 100 receives the available time data and, then, starts a count operation by using a timer integrated in the CPU 102 (step 805).

It is checked whether or not the timer counts 120 min (step 806). Until 120 min of count time, the host apparatus 100 is in a standby status. After 120 min, the window indicating the warning message upon end is created (step 807).

As mentioned above, the formed window is transmitted to the display apparatus 200 from the host apparatus 100, and the window indicating the warning message upon end is displayed on the display device 207 (step 906).

Thereafter, the host apparatus 100 stores an operating status (step 808), shuts off the power to be supplied to the display apparatus 200 (step 907), also shuts off the power of the host apparatus 100 itself (step 809), and the processing routine ends.

Although the on-screen display information is character information (such as ASCII text data) and image data as described above, it is not limited to this and it includes a wide variety of information to be displayed and informed to the user.

The second embodiment can obtain the advantages substantially similar to the first embodiment. According to the second embodiment, only the on-screen display information is stored in the display apparatus and the host apparatus generates the video signal for indication based on the on-screen display information. Consequently, the display apparatus can selectively be connected to a plurality of host apparatuses with the simple and small-sized display system having no controller, thereby realizing the display system which matches the general purpose very well.

By the simple connection between the host apparatus and the display apparatus not via the controller, the display system can display the appropriate on-screen display information in accordance with the type of the connected apparatuses while implementing the small and light display apparatus.

Figure 12:
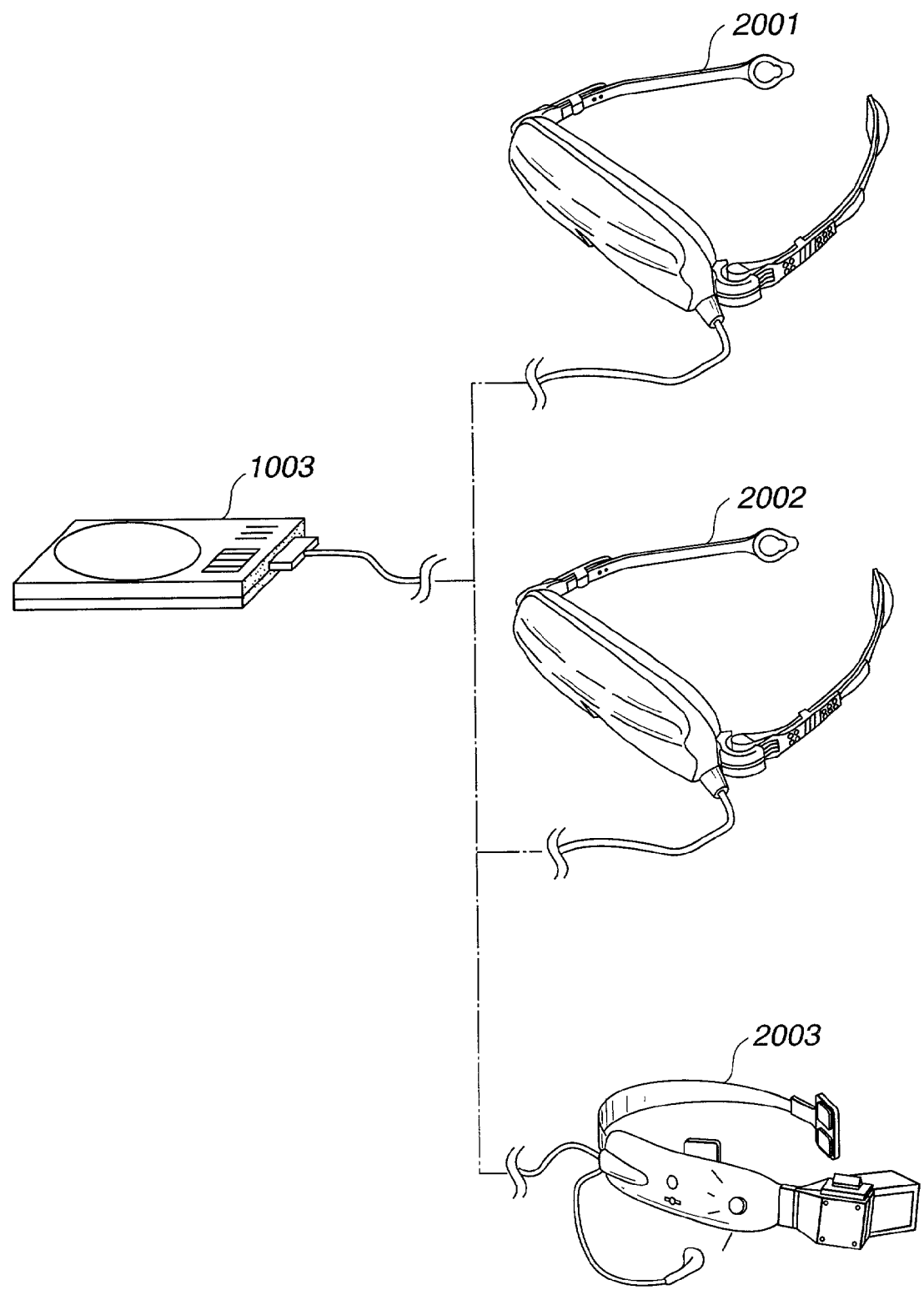
FIG. 12 is a diagram showing an example of the structure of a display system capable of selectively connecting a plurality of display apparatuses to the host apparatus according to a third embodiment of the present invention.
Figure 13:
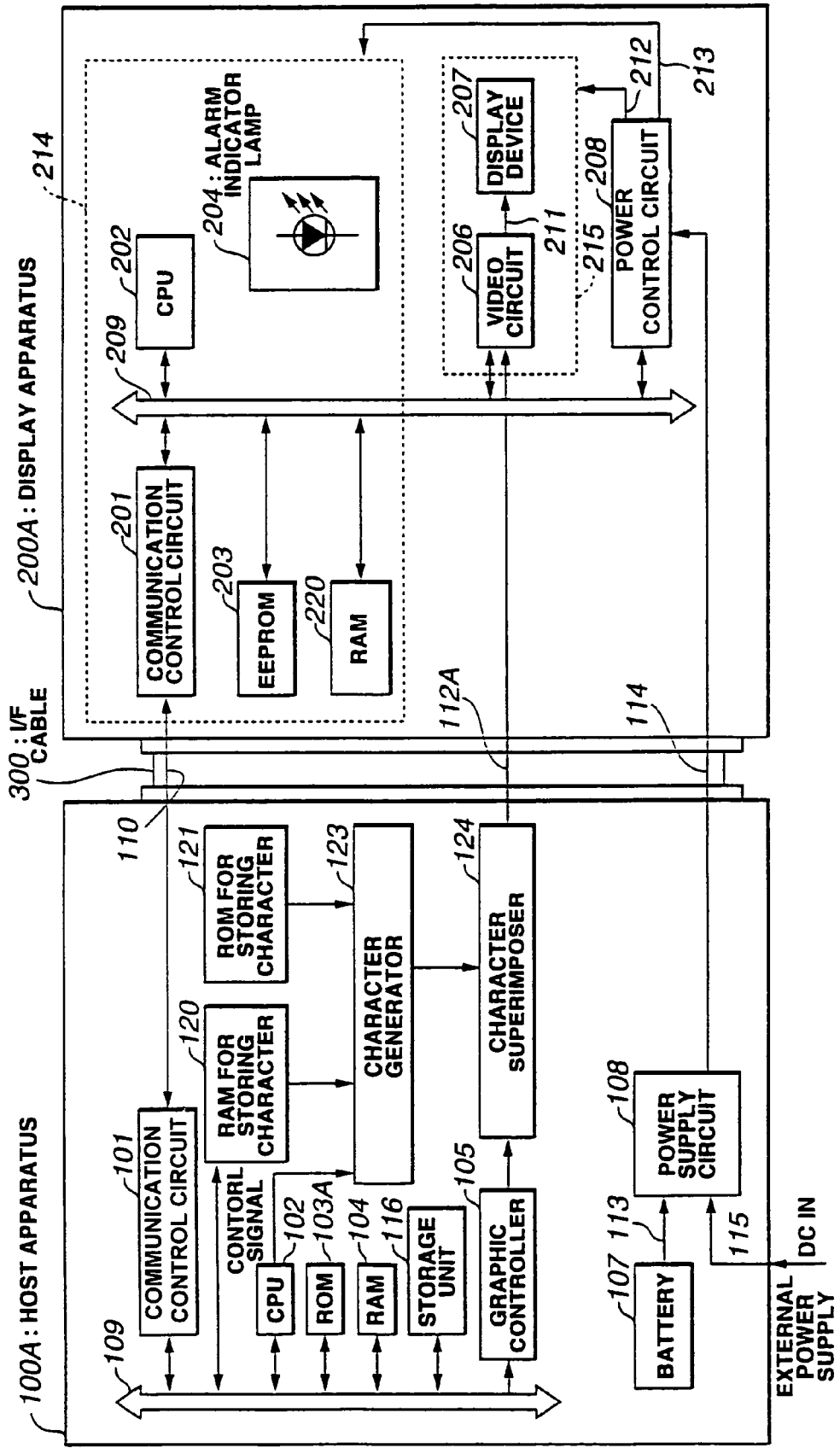
FIG. 13 is a block diagram schematically showing the display system in which a portable-type DVD player as the host apparatus and the display apparatus are connected via a display interface according to the third embodiment.
Figure 14:
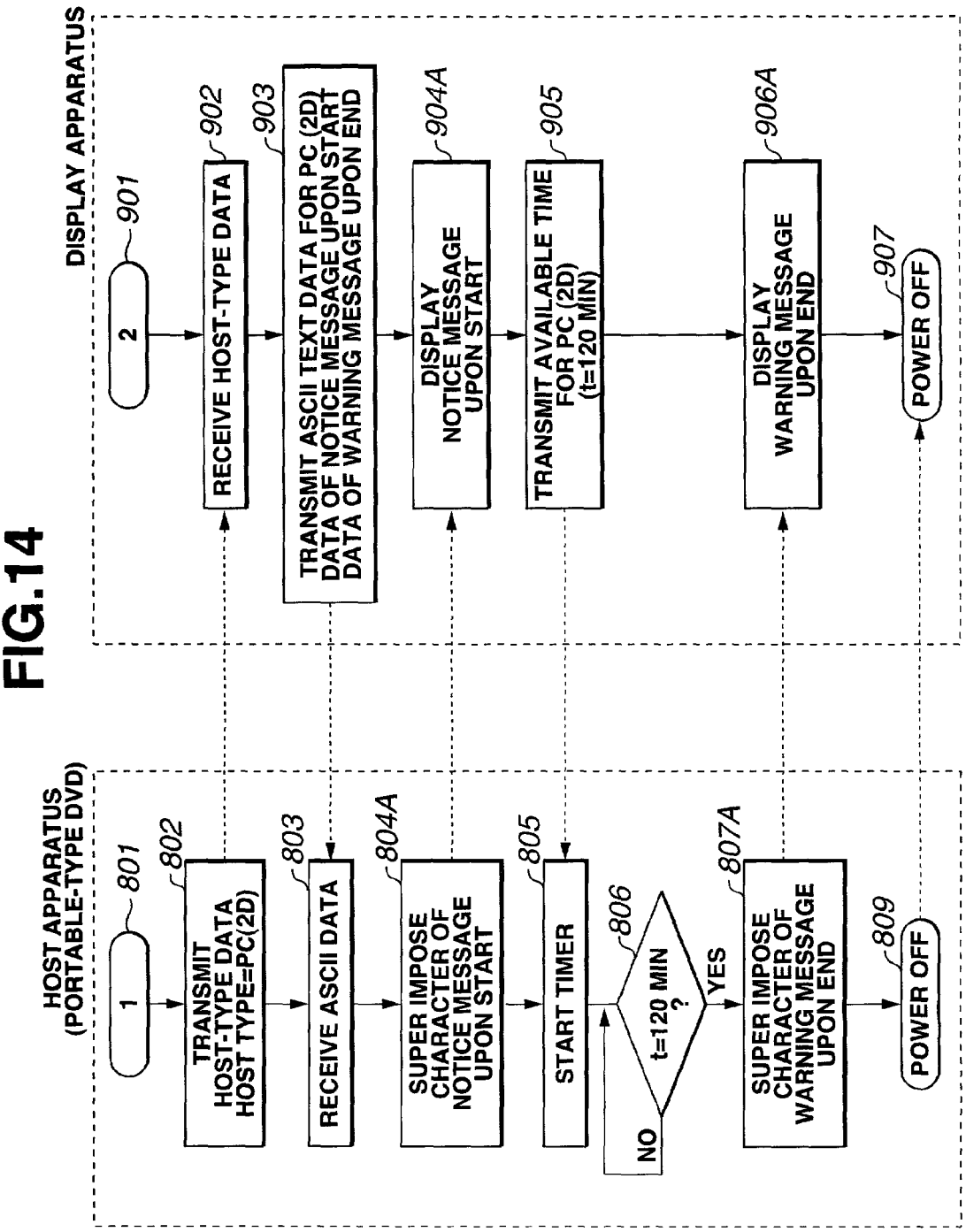
FIG. 14 is a flowchart showing a process between the host apparatus and the display apparatus according to the third embodiment.

FIGS. 12 to 14 show a third embodiment of the present invention, in which FIG. 12 is a diagram showing an example of the structure of a display system capable of selectively connecting a plurality of display apparatuses to a host apparatus, FIG. 13 is a block diagram schematically showing the display system in which a portable-type DVD player as a host apparatus and a display apparatus are connected via a display interface, and FIG. 14 is a flowchart showing a process between the host apparatus and a display apparatus.

In the third embodiment, a description of the same portions as those of the first and second embodiments is omitted and only different potions are mainly described.

Referring to FIG. 12, selectively connected to a portable-type DVD player 1003 as a host apparatus are different types of microdisplay apparatuses such as a binocular-type display apparatus 2001, a binocular-type wide display apparatus 2002, a monocular-type display apparatus 2003, and the like.

In the display system with the above configuration, in some cases, information to be displayed on an on-screen display is varied depending on the type of display apparatus (maker, machine type, etc.) connected to the host apparatus. For example, since power consumption is varied depending on the machine type of display apparatus, the corresponding notice message and message of end time need to be displayed. The display system of the third embodiment can cope with the necessity.

Referring to FIG. 13, a description is given of the structure of a host apparatus 100A and a display apparatus 200A.

The host apparatus 100A and display apparatus 200A in FIG. 13 have substantially the same structure as that of FIG. 1 in the first embodiment. However, the followings are different from the first embodiment.

First, the host apparatus 100A is, for example, a portable-type DVD, and comprises: a ROM 121 for character storage as first storing means for storing on-screen display information on the host apparatus 100A (such as information for displaying DVD menu); a RAM 120 for character storage as second storing means for storing on-screen display information transmitted by the display apparatus 200A; a character generator 123 having information superimposing means for reading the ASCII data, etc. from the ROM 121 for character storage and the RAM 120 for character storage under the control of the CPU 102 and for generating font data of a bit map, etc.; and a character superimposer 124 having information superimposing means for superimposing the on-screen display information outputted by the character generator 123 to the video signal outputted by the graphic controller 105. The host apparatus 100A uses a ROM 103A, instead of the EEPROM 103.

In the display apparatus 200A, the EEPROM 203 as the storing means stores therein character information as the on-screen display information, etc. corresponding to the type of host apparatus 100A. Further, the display apparatus 200A is provided with a RAM 220, connected to the system bus 209, for temporarily storing therein the character information, etc. when transmitting it via the communication control circuit 201.

Since the video signal is directly transmitted to the display apparatus 200A from the host apparatus 100A without serial conversion of the video signal in the display system, no video interface circuits 106 and 205 in FIG. 1 are provided. Thus, the video signal outputted from the character superimposer 124 is directly inputted to the video circuit 206 via a signal line 112A.

In the above-described configuration, if the display apparatus 200A is connected to the host apparatus 100A, the connection is detected by the plug and play and then the power is fed to the display apparatus 200A from the host apparatus 100A and the various information on the display apparatus 200A is transmitted to the host apparatus 100A.

In this case, the character information stored in the EEPROM 203, etc. is temporarily developed to the RAM 220 under the control of the CPU 202, and the developed information is transmitted to the host apparatus 100A via the communication control circuit 201.

In the host apparatus 100A, the above information is received through the communication control circuit 101 and is stored in the RAM 120 for character storage under the control of the CPU 102. The character generator 123 and the character superimposer 124 superimpose the received information into the video signal which is outputted by the graphic controller 105. Then, the superimposed signal is displayed on the display device 207 in the display apparatus 200.

Next, a description is given of an operation of the display system when a display apparatus as the microdisplay apparatus is connected to a portable-type DVD as the host apparatus with reference to FIG. 14.

The operation in FIG. 14 is substantially the same as that shown in FIG. 11. However, the following points are different. That is, first, in the host apparatus 100A, instead of step 804, a character of a notice message upon start is superimposed (step 804A) and, in the display apparatus 200A, instead of step 904, a notice message upon start is displayed (step 904A). Secondarily, in the host apparatus 100A, in place of step 807, a character of a warning message upon end is superimposed (step 807A) and, in the display apparatus 200A, in place of the step 906, a warning message upon end is displayed (step 906A). Finally, since the host apparatus 101A is a portable-type DVD, the storage of the operating status in step 808 is omitted.

The third embodiment has the advantages substantially similar to those of the first and second embodiments. Further, a plurality of types of display apparatuses can be selectively connected to the single host apparatus. Consequently, the display system which matches the general purpose very well can be realized.

Although the display system which controls power displays information such as the character in the second and third embodiments on the screen through the communication, the display system is not limited to a system having the power control function.

More specifically, if providing a receiving and transmitting system of communication data in conformity with the VESA standard or the like between the host apparatus and the display apparatus, the host apparatus transmits the character information or the like which is stored in the display apparatus and superimposes the transmitted information to the video signal. The display apparatus receives the superimposed video signal. Thereby, the display system can implement the plug and play which performs the on-screen display.

Figure 15:
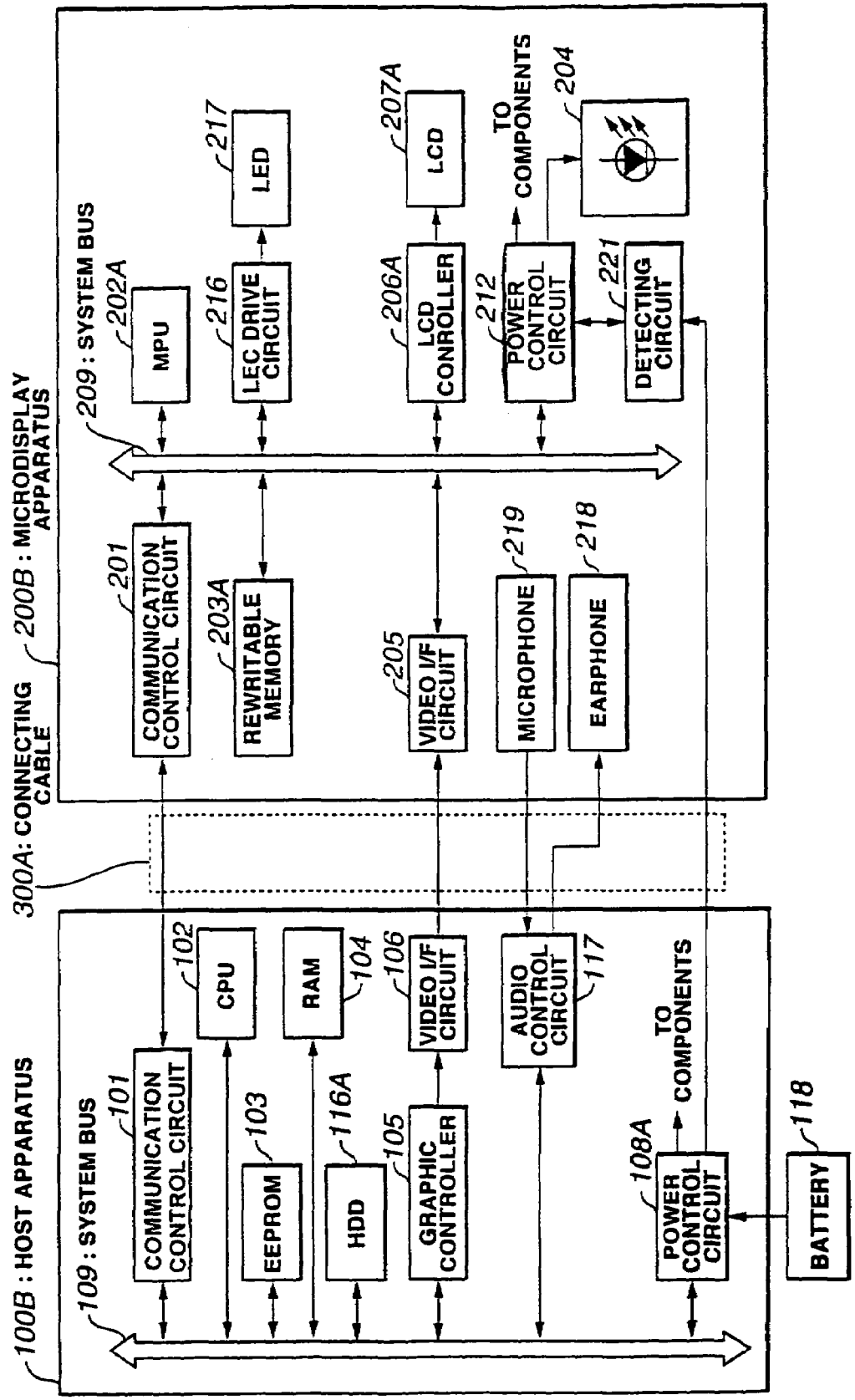
FIG. 15 is a block diagram schematically showing a microdisplay apparatus and a display apparatus according to a fourth embodiment of the present invention.
Figure 16:
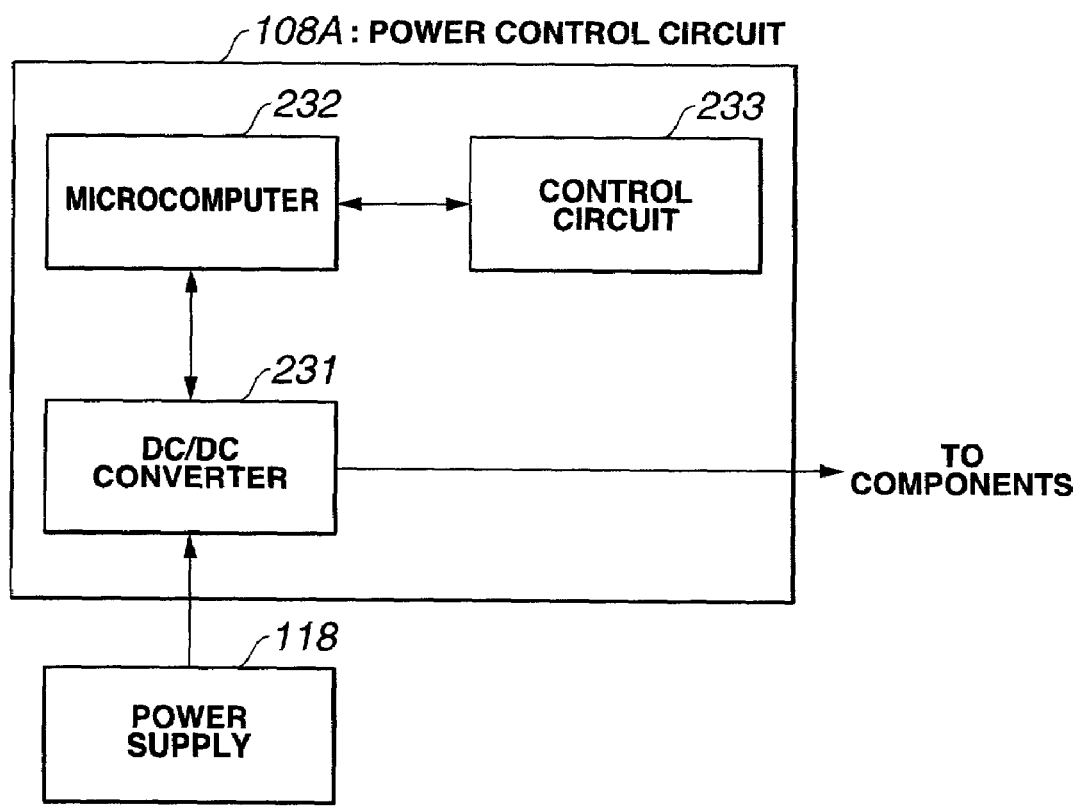
FIG. 16 is a block diagram showing the structure of a power control circuit in the host apparatus according to the fourth embodiment.
Figure 17:
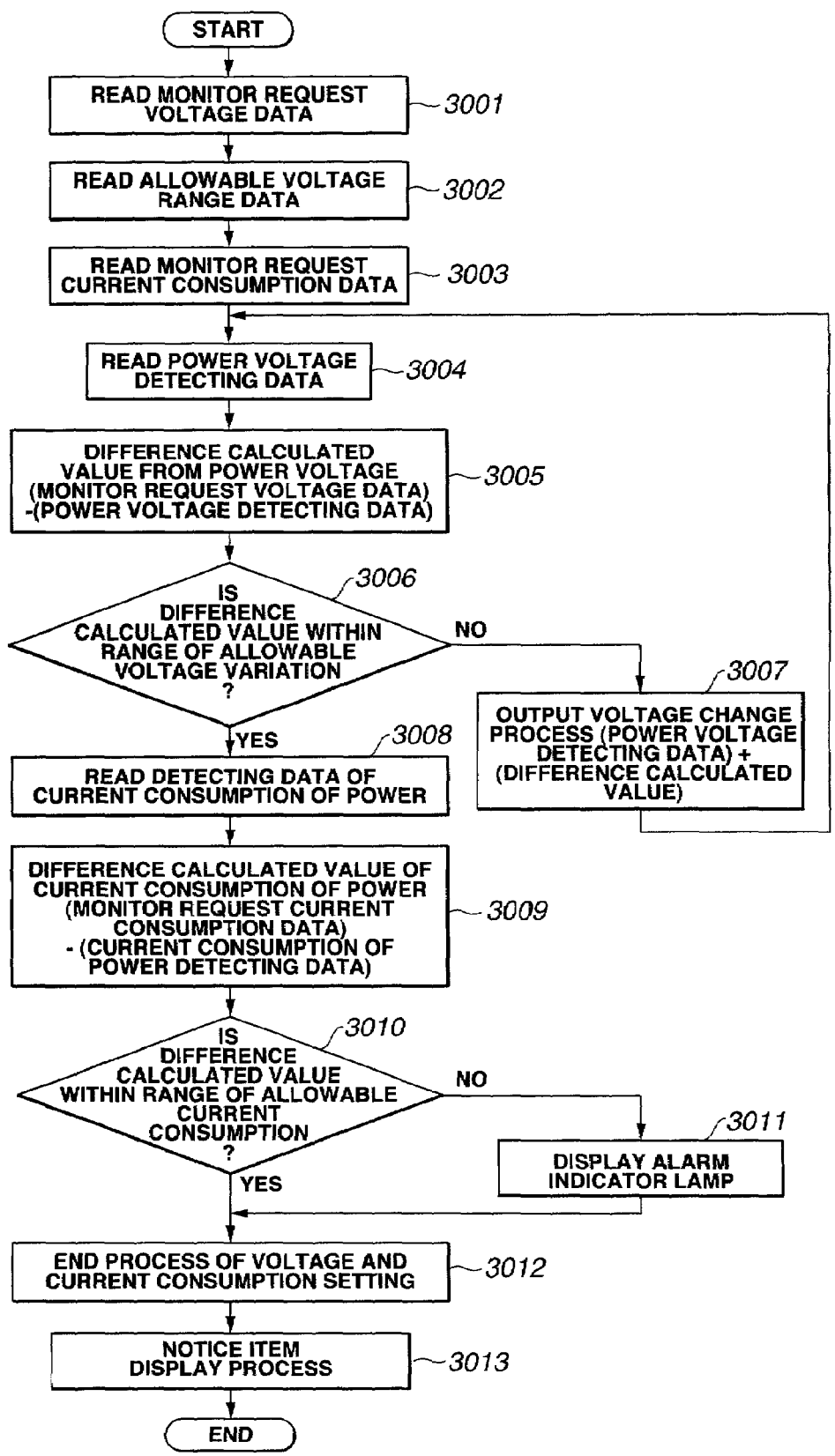
FIG. 17 is a flowchart showing a process for power control in accordance with EDID information according to the fourth embodiment.
Figure 18:
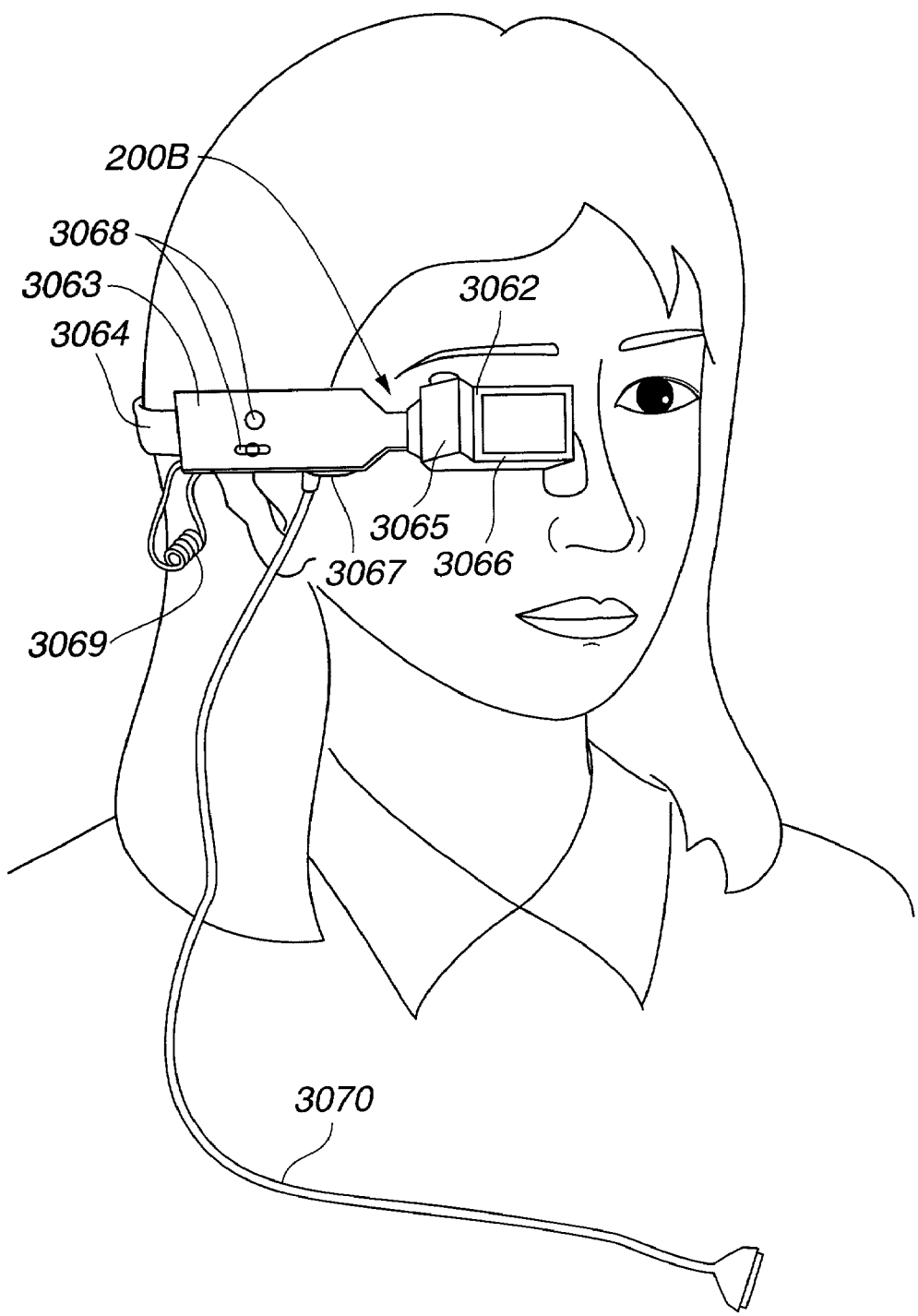
FIG. 18 is a diagram showing an example in which a head mounted type display apparatus is mounted on the head or face of an operator according to the fourth embodiment.

FIGS. 15 to 18 show a fourth embodiment of the present invention, in which FIG. 15 is a block diagram schematically showing a microdisplay apparatus and a display system, FIG. 16 is a block diagram showing the structure of a power control circuit in FIG. 15, FIG. 17 is a flowchart showing a process for power control in accordance with the EDID information, and FIG. 18 is a diagram showing an example in which a head mounted type display apparatus in FIG. 5A or 5B is mounted on to the head or face of an operator.

First, a schematic description is given of the schematic structure of the microdisplay apparatus and the display system with reference to FIG. 15.

A host apparatus 100B and a microdisplay apparatus 200B are connected via a connecting cable 300A.

The host apparatus 100B comprises: a communication control circuit 101; a CPU 102 as control means; an EEPROM 103; a RAM 104; a hard disk device (HDD) for auxiliary memory 116A, a graphic controller 105, an audio control circuit 117, and a power control circuit 108A. The above components are connected to a system bus 109.

The EEPROM 103 stores therein control programs such as BIOS (Basic I/O System). The RAM 104 is used as a work area for calculation, etc.

The audio control circuit 117 processes an audio signal to be a signal suitable for the microdisplay apparatus 200B, and is connected to an earphone 218 in the microdisplay apparatus 200B via the connecting cable 300A. The audio control circuit 117 processes the signal from a microphone 219 in the microdisplay apparatus 200B to be a signal suitable for the host apparatus 100B.

A video interface circuit 106 is connected to the graphic controller 105, and processes a signal supplied from the graphic controller 105 to display the signal on the microdisplay apparatus 200B. Thus, the video interface circuit 106 includes a microcomputer and the like.

The video interface circuit 106 is connected to a video interface circuit 205 in the microdisplay apparatus 200B. These video interface circuits 106 and 205 are circuits for reception and transmission which transfer, for example, a detailed moving image of VGA/SVGA/XGA having a 24-bit gradation.

In the host apparatus 100B, the graphic controller 105 controls a display operation, thereby performing parallel/serial conversion in the video interface circuit 106. The display data is received by the video interface circuit 205 in the microdisplay apparatus 200B via the connecting cable 300A.

The video interface circuit 205 performs serial/parallel-conversion of the received display data, and transmits the display data to an LCD controller 206A via a system bus 209.

A power supply 118 supplies predetermined power and, then, a power control circuit 108A supplies predetermined power to the above mentioned components. The power control circuit 108A supplies power corresponding to the microdisplay apparatus 200B to a detecting circuit 221 as detecting means and a power control circuit 212 under the control of the CPU 102. These detecting circuit 221 and the power control circuit 212 are controlled by an MPU 202A.

When the host apparatus 100B is turned on, power necessary for communication of the EDID information is fed to the microdisplay apparatus 200B, thereby reading the EDID information including new information stored in a rewritable memory 203A as the storage means (refer to Table 1). By communication between the communication control circuits 201 and 101 as communication interface means, the read data is stored in the RAM 104 of the host apparatus 100B.

As shown in FIG. 16, the power control circuit 108A includes a DC/DC converter 231, a microcomputer 232, and a control circuit 233. The power control circuit 108A reads the EDID information stored in the RAM 104 via the system bus 109, compares the EDID information with detected data of a power voltage and detected data of current consumption of power. Based on the comparison result, the power control circuit 108A sets an output voltage and supplies power to the microdisplay apparatus 200B.

In the DC/DC converter 231, an input voltage is 3.3V to 20V of DC, an output voltage is 2.5V to 7V of DC, the output voltage can further be changed linearly or at pitch of 0.5V, and current of 0.5 A. or more can be outputted.

Herein, a description is given of a process for comparing the EDID information with the detected data of the power voltage (power voltage detected value) and the detected data of the current consumption of power (power-current consumption detected-value) with reference to FIG. 17. The host apparatus 100B executes this process.

First, the host apparatus 100B reads monitor request voltage data in monitor request voltage information of the EDID information which is stored in the RAM 104 (step 3001), then, reads allowable voltage range data of the monitor request voltage information (step 3002), further, reads the monitor request current consumption data of monitor current consumption information in the EDID information (step 3003), and reads the detected data of power voltage which is stored in the RAM 104 (step 3004).

Sequentially, the host apparatus 100B calculates a difference between the read monitor request voltage data and the read power voltage detected data (step 3005).

It is determined whether or not the difference calculated value is within the allowable voltage variation range (step 3006). If NO in step 3006, the processing routine shifts to an output voltage change process. The host apparatus 100B outputs a power voltage obtained by adding the power voltage detected data to the difference calculated value (step 3007) and, thereafter, the processing routine returns to step 3004.

If YES in step 3006, the host apparatus 100B reads the detected data of current consumption of power which is stored in the RAM 104 (step 3008).

Sequentially, the host apparatus 100B calculates a difference between the monitor request current consumption data and the read detected data of current consumption of power (step 3009). It is determined whether or not the difference calculated value is within the allowable range of the current consumption (step 3010).

If NO in step 3010, the alarm indicator lamp 204 is displayed (step 3011). If YES in step 3010, an end process for setting voltage and current consumption of power is executed (step 3012).

Then, after a notice item display process (step 3013), the above process ends.

On the other hand, the microdisplay apparatus 200B comprises: a communication control circuit 201 for receiving and transmitting data from/to the host apparatus 100B; an MPU 202A for entirely controlling the microdisplay apparatus 200B; a rewritable memory 203A for storing a firmware for display control of the microdisplay apparatus 200B and the EDID information, etc.; a video interface circuit 205; an LCD controller 206A for display control of an LCD 207A in response to data serial/parallel-converted by the video interface circuit 205; the LCD 207A for displaying data under the control of the LCD controller 206A; an LED drive circuit 216 for driving an LED 217 in response to an LED control signal from the LCD controller 206A; the LED 217 for emitting light by drive operation of the LED drive circuit 216; an earphone 218; a microphone 219; a power control circuit 212; a detecting circuit 221; and the alarm indicator lamp 204.

Thereamong, connected to the system bus 209 are the communication control circuit 201, MPU 202A, rewritable memory 203A, LED drive circuit 216, video interface circuit 205, LCD controller 206A, and power control circuit 212.

The rewritable memory 203A stores therein initial data, user set data such as luminance and video image, information required for display control, adjusting data for manufacturing factory of the microdisplay apparatus, EDID information, data corresponding to the plug and play system, and the like, which are related to the MPU 202A, LCD controller 206A, LCD 207A, and LED drive circuit 216.

An EPROM, EEPROM, flash EEPROM, etc. can be used as the rewritable memory 203A. These memories are rewritable.

Incidentally, in the microdisplay apparatus 200B, by opening a cover as a case and rewriting a memory element via an interface or by replacing the memory element by using the memory element with a socket, the firmware for display control can be updated. Further, an install program is executed on the host apparatus 100B side. Thereby, an IPL (Initial Program Loader) in the rewritable memory 203A is operated and the rewritable memory 203A can be rewritten.

Although the rewritable memory 203A is arranged separately from the MPU 202A in FIG. 15, it may be integrated in the MPU 202A. Thus, the functions can be added or modified, alternatively, debug on software can be simply performed.

The EDID information stored in the rewritable memory 203A includes existing EDID information based on, e.g., a DDC standard prescribed by the VESA (Version of Revision on Dec. 12, 1994) shown in Table 1 and additional EDID information.

TABLE 1

| EDID information | |
|---|---|
| Name of data | Contents |
| Header | Start position of data |
| Product Vender/Product Identification | Name of vender, Manufacturing year, Product No. |
| EDID version | EDID (VERSION/REVISION) |
| Monitor specification | Max screen size, Color characteristics, Correspondence to specified timing, Correspondence to another timing, Detailed timing, etc. |
| Others | Omitted |
| Additional EDID information | Monitor request voltage information, Monitor current consumption information, Notice item display information |

The existing EDID information includes a plurality of blocks of data, having the total 128 bytes, such as "Monitor specification", "Header", "Vender/Product Identification", and "EDID version/revision".

The "monitor specification" block corresponds to data of plug and play for simplifying set-up, and is composed of basic display parameters such as maximum screen size and display transfer gamma characteristics, color characteristics, correspondence to a specified timing associated with PC terminal equipment of a specific maker and correspondence to another timing, detailed timing, and the like.

The additional EDID information includes the monitor request voltage information having monitor request voltage data and the allowable voltage range data, monitor current consumption information, and notice item display information.

Thereamong, the notice item display information is notice item data specified to the microdisplay apparatus and, to be concrete, it includes notice data before or during the use of the microdisplay apparatus (such as "read user's manual before use", etc.) and timing data for indicating the notice data.

The detecting circuit 221 is connected to the power control circuit 212, and compares an input voltage of power supplied by the host apparatus 100B with a reference voltage of the microdisplay apparatus 200B. Further, the detecting circuit 221 subjects the power voltage detected data resulted from the comparison to A/D conversion and transmits the converted data to the MPU 202A. In addition, the detecting circuit 221 detects current consumption of power supplied by the host apparatus 100B, subjects the detected data of the current consumption of power to A/D conversion, and transmits it to the MPU 202A.

The MPU 202A transfers both the received detected-data of the power voltage and detected data of current consumption of power to the CPU 102 in the host apparatus 100B via the communication control circuits 201 and 101.

The CPU 102 stores both the detected data of the power voltage and detected data of current consumption of power in the RAM 104.

The host apparatus 100B and the microdisplay apparatus 200B are set up in the following manner.

First, the microdisplay apparatus 200B is connected to the host apparatus 100B and a power switch (not shown) provided to the host apparatus 100B is turned on. Thus, the CPU 102 in the host apparatus 100B starts and the microdisplay apparatus 200B is detected.

On the other hand, the MPU 202A in the microdisplay apparatus 200B starts a download process program based on an instruction from the CPU 102 and is initialized. After predetermined period of time, the MPU 202A receives a read request signal of download data, then, reads the EDID information such as the monitor specification data which is stored in the rewritable memory 203A, and transfers the read EDID information to the host apparatus 100B via the communication control circuits 201 and 101. In the host apparatus 100B, the transferred EDID information is stored into the RAM 104 under the control of the CPU 102.

Also, in the replacement of the microdisplay apparatus 200B during the operation, the above-mentioned download process is necessary. The host apparatus 100B may supply a reset signal to the microdisplay apparatus 200B by operating a predetermined reset key (not shown) and by using a recognizing signal, etc. which is generated when recognizing a new microdisplay apparatus based on the plug and play system, thereby executing the above download process.

The foregoing process is executed each time rewriting the EDID information, for example, upon turning on the power of the host apparatus 100B again, upon replacing the microdisplay apparatus 200B, etc.

The EDID information is stored in the RAM 104 and, after a predetermined period of time, the CPU 102 in the host apparatus 100B starts a power set process program. Thus, power is fed to the components in the host apparatus 100B and the microdisplay apparatus 200B.

The host apparatus 100B sets an output voltage to the microdisplay apparatus 200B in the following manner.

To start with, the power control circuit 108A compares information stored in the RAM 104, i.e., the monitor request voltage information in the EDID information, monitor current consumption information in the EDID information, power voltage detected data, and power current-consumption detected data. Based on the comparison result, the output voltage is set and is fed to the microdisplay apparatus 200B.

In the microdisplay apparatus 200B, the detecting circuit 221 detects an input power-voltage and a consumed current. The detected data of the power voltage and the power current-consumption are transferred to the host apparatus 100B via the communication control circuit 201 and are stored in the RAM 104.

The power control circuit 108A reads the monitor request voltage information and the power voltage detected data, in the EDID information, which are stored in the RAM 104, compares them, and feeds a set output-voltage to the microdisplay apparatus 200B. The above comparison is iterated until a voltage difference between the monitor request voltage information and the power voltage detected data falls within an allowable range, as shown in FIG. 17.

The power control circuit 108A sets the output voltage supplied to the microdisplay apparatus 200B and reads the monitor consumed current information and the power current consumption detected data in the EDID information stored in the RAM 104, thereby comparing them. As the comparison result, if the current consumption is within the allowable range, the power control circuit 108A outputs power to the microdisplay apparatus 200B. If the current consumption is not within the allowable range, the power control circuit 108A causes the display of the alarm indicator lamp 204. If the microdisplay apparatus 200B is a head mounted type display apparatus, the alarm indicator lamp 204 corresponds to the alarm indicator lamp 34 shown in FIG. 5A or 5B which is arranged nearby the arm portion or the observation window of the viewer portion in the head mounted microdisplay apparatus and thus, the alarm indication is made by the emission of light of the lamp 34.

FIG. 18 shows an example in which the head mounted type display apparatus is mounted on the face of an operator.

The microdisplay apparatus 200B comprises: a viewer portion 3062; an arm portion 3063; a head band portion 3064; an LCD frame portion 3065; a main prism portion 3066; a face pad 3067; a button member 3068; an earphone cable 3069; and a cable 3070.

The host apparatus 100B is connected to the microdisplay apparatus 200B via the cable 3070 and, in many cases, it is arranged on the downside of the microdisplay apparatus 200B attached to the face. Preferably, the cable 3070 is connected on the lower side of the microdisplay apparatus 200B main body to prevent the addition of unnecessary force to the cable 3070 when the microdisplay apparatus 200B is equipped. So long as the cable 3070 is connected the center of operation (rotation) of a position adjusting mechanism, the change of a fixed position of the microdisplay apparatus 200B can be suppressed by weight of the cable 3070 itself even if fine vibration is applied due to the walking of the operator and the like. Further, by switching the arrangement of the cable 3070 in accordance with switching operation of the mounted position of the microdisplay apparatus 200B, that is, right-eye side or left-eye side, an output of the video image may be switched in such a manner that it becomes inverted because the display video image is vertically inverted in the right eye and the left eye.

The host apparatus 100B comprises two ore more output means of fixed voltages as the output power-voltages of the host apparatus 100B. Among the means, the fixed voltage output means may be selected to include the voltage difference of the power voltage detected data within the allowable range.

Further, if the image signal, audio signal, and the like are communicated via radio wave, the connecting cable 300A may effect only a function of the power cable.

And, when the output voltage to the microdisplay apparatus 200B is needed to change in the host apparatus 100B to which the apparatus 200B and another equipment other than the apparatus 200B are connected in parallel, it is recommended to change the output voltage to the apparatus 200B after displaying on the apparatus 200B a warning about the influence of the change to the equipment other than the apparatus 200B to get the operator's agreement first.

In addition, the power supply 118 may supply AC power to the host apparatus 100B by an AC adapter, etc. However, the power supply 118 is not limited to this. An A/D converter is arranged to the host apparatus 100B and the AC power may be directly fed to the host apparatus 100B. Further, the power supply 118 is not limited to the AC power and may be means such as a battery and photovoltaic DC power generator.

Although the power control circuit 108A comprises the microcomputer as mentioned above, it is not limited to this. The power control circuit 108A may also be shared with the microcomputer in the video interface circuit 106.

According to the fourth embodiment, the display apparatus can be reduced in size and be properly mounted.

Next, a description is given of the structure in which a signal format converting apparatus for converting an image signal format is arranged between an image supply apparatus and a display apparatus and a recording medium for recording characteristics of components is integrated in the display apparatus and the format converting apparatus with reference to FIGS. 19 to 23.

Figure 19:
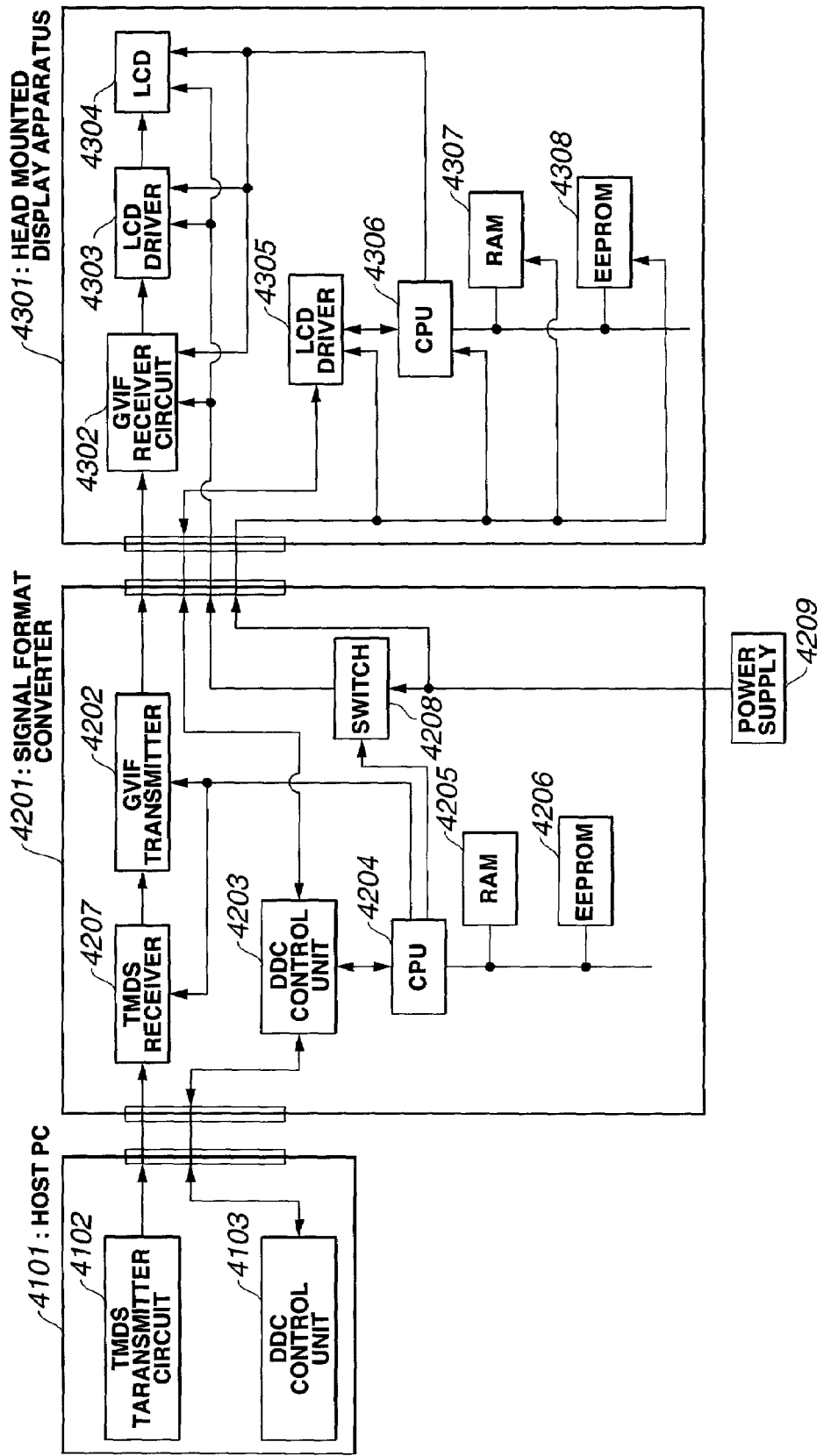
FIG. 19 is a block diagram showing the structure of a display system in a first example of the structure having a signal format converter.
Figure 20:
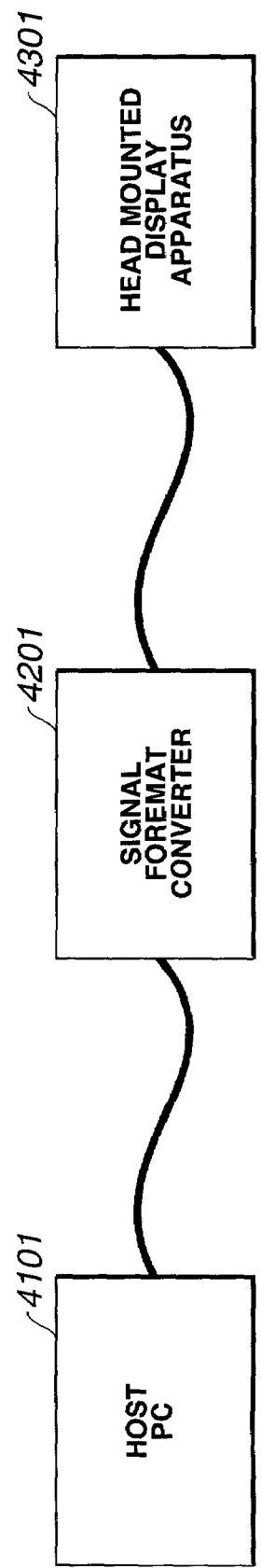
FIG. 20 is a block diagram schematically showing the display system to which the first example of the structure is applied.
Figure 21:
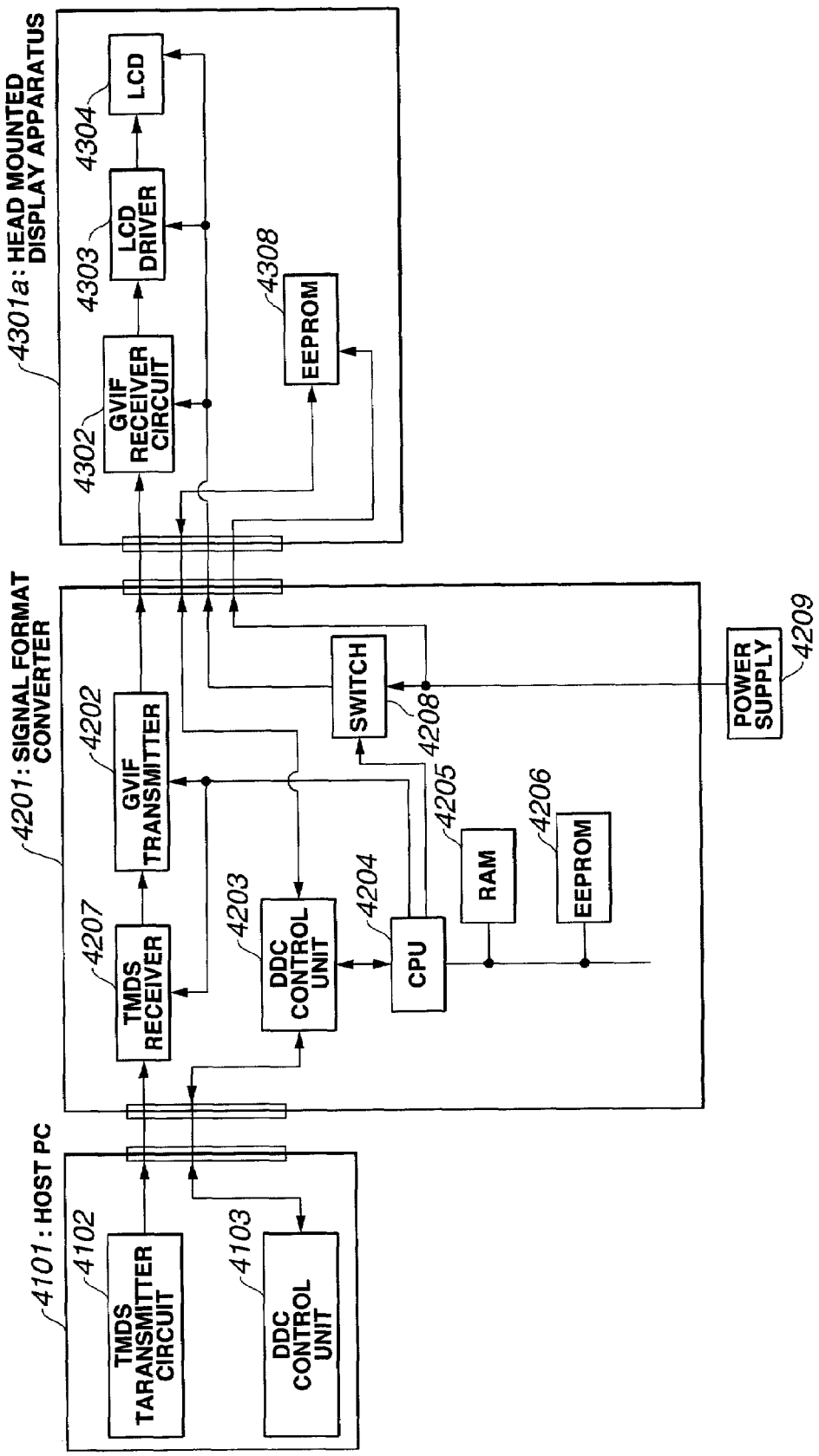
FIG. 21 is a block diagram showing a display system in a second example of the structure having a signal format converter.
Figure 22:
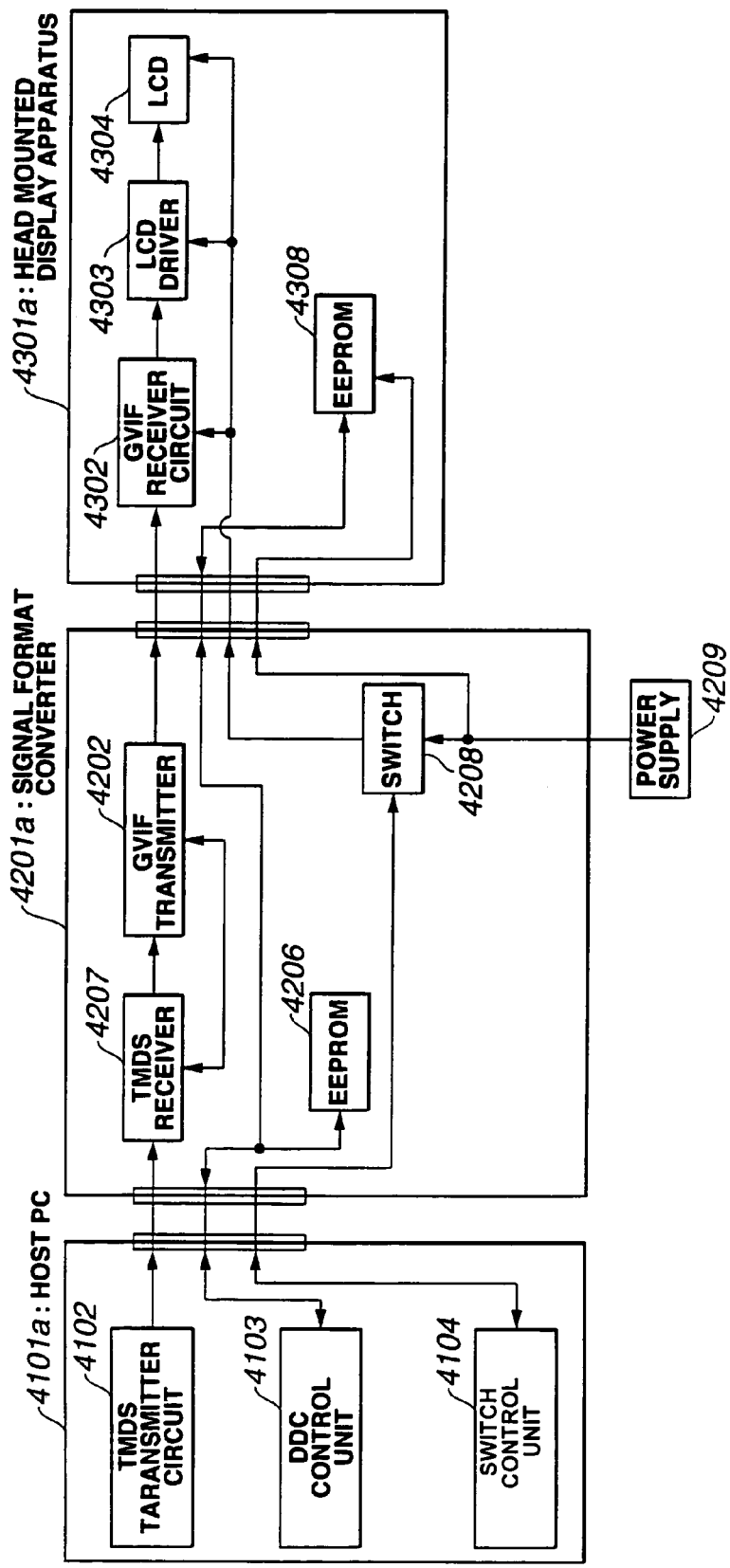
FIG. 22 is a block diagram showing a display system in a third example of the structure having a signal format converter.
Figure 23:
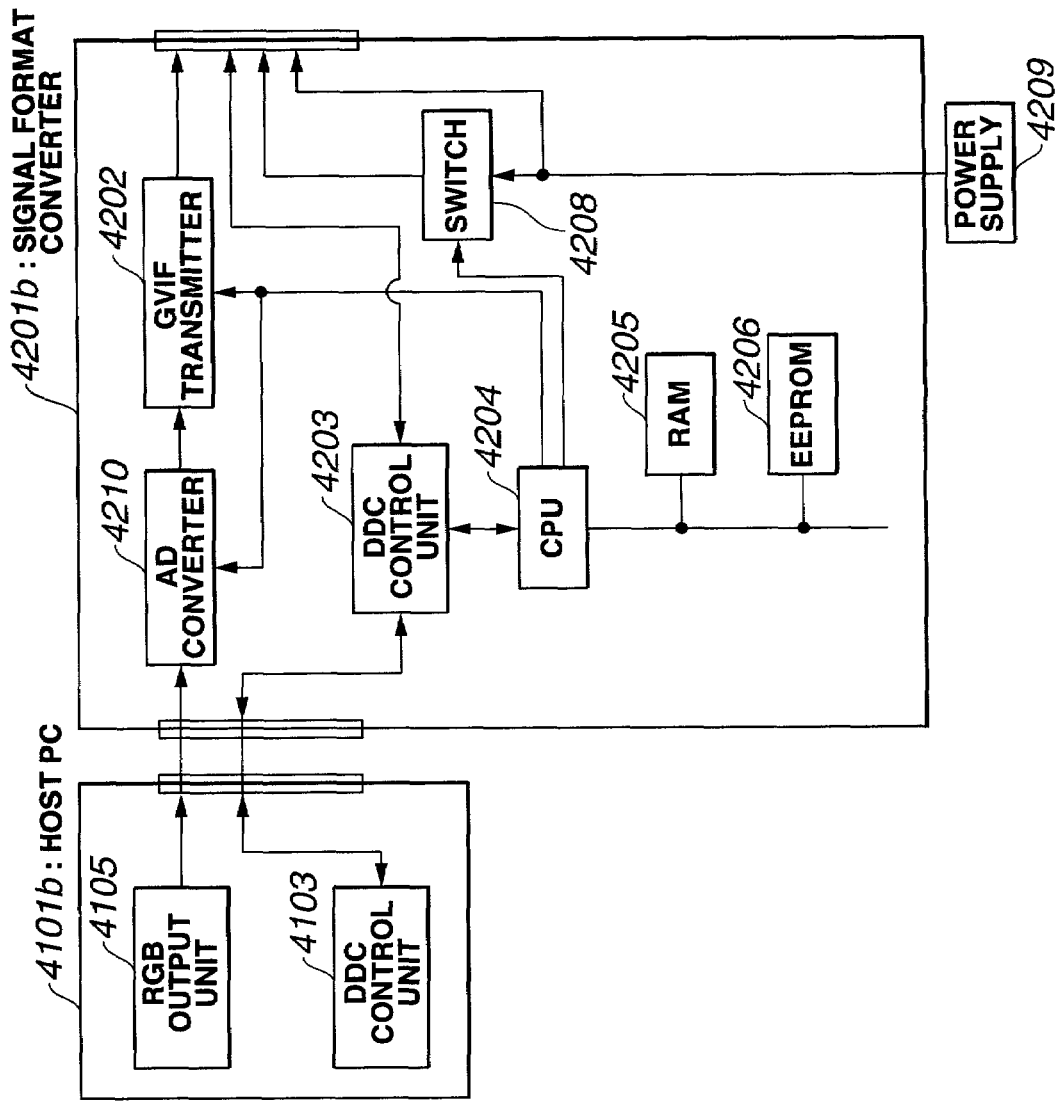
FIG. 23 is a block diagram showing a display system in a fourth example of the structure having a signal format converter.

FIG. 19 is a block diagram showing the structure of a display system in a first example of the configuration having a signal format converting apparatus, FIG. 20 is a block diagram schematically showing the display system to which the first example of the configuration is applied, FIG. 21 is a block diagram showing a display system in a second example of the configuration having a signal format converting apparatus, FIG. 22 is a block diagram showing a display system in a third example of the configuration having a signal format converting apparatus, and FIG. 23 is a block diagram showing a display system in a fourth example of the configuration having a signal format converting apparatus.

First of all, the first example of the configuration is described with reference to FIGS. 19 and 20.

Referring to FIG. 20, a host PC (Personal Computer) 4101 as a host apparatus is connected to a head mounted type display apparatus 4301 as a microdisplay apparatus via a signal format converter 4201 as a signal format converting apparatus.

The head mounted type display apparatus 4301 contains, for example, Si-chip based liquid crystal of 0.47 inch, and the liquid crystal is driven in accordance with a field sequential system, thereby displaying a high definition image. For instance, a specific example of the head mounted type display apparatus is disclosed in Japanese Patent Application 11-222855.

The host PC 4101, as an image supply apparatus, comprises a computer having a standard TMDS digital interface or a computer in which a PC-card-type digital interface is inserted into a PC card slot or PCI bus. The host PC 4101 selectively has a USB interface and an IEEE1394 interface (not shown) as interfaces.

Referring to FIG. 19, the host PC 4101 comprises a TMDS transmitter 4102 and a DDC control unit 4103. The TMDS transmitter circuit 4102 outputs signal image data and a video timing signal. In this time, the output signal format is TMDS.

On the other hand, the head mounted type display apparatus 4301 corresponds to a GVIF input signal.

Since the head mounted type display apparatus 4301 cannot be connected to the host PC 4101 in the above state, the signal format converter 4201 is provided between the host PC 4101 and the head mounted type display apparatus 4301.

More specifically, the signal format converter 4201 converts a TMDS digital signal into GVIF digital data. A TMDS receiver circuit 4207 receives the image data transmitted by the host PC 4101 and a GVIF transmitter circuit 4202 converts the received data into digital data again. The digital data is transmitted to the head mounted type display apparatus 4301.

An EEPROM 4206 provided in the signal format converter 4201 stores therein EDID data having a description of a function (feature) of the signal format converter 4201. A CPU 4204 provided in the signal format converter 4201 reads and writes data to/from the EEPROM 4206. The CPU 4204 works by using a RAM 4205 provided in the signal format converter 4201.

Further, a DDC control unit 4203 provided in the signal format converter 4201 executes the following operations in accordance with an instruction from the CPU 4204.

(1) The EDID data in the head mounted type display apparatus 4301 is read.

(2) The EDID data of the signal format converter 4201 itself or EDID data of the head mounted type display apparatus 4301 are written to the host PC 4101.

(3) Upon abnormal condition, contents thereof are transmitted to the host PC 4101 and an instruction is given from the host PC 4101.

A power supply 4209 is connected to the signal format converter 4201. The power from the power supply 4209 is fed to the head mounted type display apparatus 4301 via the signal format converter 4201. The power feed route is branched to two routes. On one power feed route, a switch 4208 is arranged and the CPU 4204 controls the switch 4208, thereby partly turning on/off the power.

The power supply 4209 may be an AC power fed via an AC adapter or with a battery. However, the power supply 4209 must feed power of at least 5V and 0.5 A. By properly combining the power supply 4209 with driver software, power may be fed via an USB interface of the host PC 4101, IEEE1394 interface, PCI bus, PS/2 interface, or the like.

The head mounted type display apparatus 4301 uses a GVIF receiver circuit 4302 and an LCD driver 4303, thereby converting a GVIF digital signal received by the signal format converter 4201 into an LCD drive signal. The image is displayed on an LCD 4304.

An EEPROM 4308 in the head mounted type display apparatus 4301 stores therein the EDID data having a description of a function (feature) of the head mounted type display apparatus 4301. A CPU 4306 reads/writes data to/from the EEPROM 4308. The CPU 4306 works by using a RAM 4307 provided in the head mounted type display apparatus 4301.

A DDC control unit 4305 provided in the head mounted type display apparatus 4301 executes the following operations in accordance with an instruction from the CPU 4306.

(1) The EDID data is written to the signal format converter 4201.

(2) Upon abnormal condition, contents thereof are transmitted to the signal format converter 4201 and an instruction is given from the signal format converter 4201.

Next, a description is given of operations of the display system with reference to Table 2 and Table 3 showing the EDID data of the signal format converter 4201 and the EDID data of the head mounted type display apparatus 4301. Incidentally, Table 2 and Table 3 show a part of the EDID data and, in detail, they include data contents compliant with the VESA standard.

TABLE 2

| Name of data | Contents of EEPROM in signal format converter | Contents of EEPROM in head mounted type display apparatus |
|---|---|---|
| Product ID | A | B |
| Resolution | 1024 × 768 | 800 × 600 |
| Vertical sync frequency | 75 Hz | 60 Hz |
| Current capacity | 0.5 A | 0.4 A |

TABLE 3

| Name of data | Contents of EEPROM in signal format converter | Contents of EEPROM in head mounted type display apparatus |
|---|---|---|
| Product ID | A | B |
| Resolution | 800 × 600 | 1024 × 768 |
| Vertical sync frequency | 60 Hz | 60 Hz |
| Current capacity | 0.5 A | 0.4 A |

The signal format converter 4201 reads a resolution (display resolution) and a vertical sync frequency which are stored in the EEPROM 4308 in the head mounted type display apparatus 4301. Sequentially, the signal format converter 4201 compares the read result with the performance of the signal format converter 4201. If the performance of the head mounted type display apparatus 4301 is equal to or less than that of the signal format converter 4201 (refer to Table 2), an output signal format is requested to the host PC 4101 corresponding to a capacity of the head mounted type display apparatus 4301. In the example shown in Table 2, the signal format converter 4201 requests a resolution of (800×600) and a vertical sync frequency of 60 Hz.

If the performance of the head mounted type display apparatus 4301 is equal to or more than that of the signal format converter 4201 (refer to Table 3), an output signal format is requested to the host PC 4101 and the head mounted type display apparatus 4301 corresponding to a capacity of the signal format converter 4201. In the example shown in Table 3, the signal format converter 4201 requests a resolution of (800×600) and a vertical sync frequency 60 Hz. In this case, the signal format converter 4201 transmits the request to the CPU 4306 of the head mounted type display apparatus 4301 via the DDC control units 4203 and 4305. The CPU 4306 receives the request and then adjusts a display area of the LCD 4304.

By using the means, a maximum capacity is always brought out with the combination of the signal format converter 4201 and the head mounted type display apparatus 4301.

The signal format converter 4201 determines by using the information in Table 2 or 3 and identifying a product whether or not to forbid the combination with the head mounted type display apparatus 4301 connected thereto. If the combination is forbidden, the signal format converter 4201 turns off the switch 4208, thereby stopping power feed to a display portion of the head mounted type display apparatus 4301. The signal format converter 4201 transmits an abnormal process code to the host PC 4101. The host PC 4101 performs the abnormal process corresponding to the received abnormal process code, thereby forbidding the output of the image and displaying an error to a main monitor or the abnormal condition by flicker of the LED. The above functions enable prevention of the abnormal condition such as overcapacity of power caused by the improper combination of the signal format converter 4201 and the head mounted type display apparatus 4301.

In order to protect the eyes, the head mounted type display apparatus 4301 limits continuous available time. Then, the combination of the signal format converter 4201 and the head mounted type display apparatus 4301 is detected by at least one of the host PC 4101, the CPU 4202 in the signal format converter 4201, and the CPU 4306 in the head mounted type display apparatus 4301. In accordance with the detected combination, the limit time is arbitrarily varied, thereby ensuring the protection of the eyes.

Next, the second example is described with reference to FIG. 21.

The signal format converter 4201 has the above-discussed configuration in the first example. On the contrary, a head mounted type display apparatus 4301a includes the EEPROM 4308 which stores the EDID data and, however, includes none of the CPU 4306, DDC control unit 4305, and RAM 4307.

In the configuration, the operation mode cannot be changed in accordance with the request from the signal format converter 4201. However, the signal format converter 4201 determines whether or not the combination upon using is proper. As a consequence, the use by the improper combination can be prevented.

The second example of the configuration has the advantages substantially similar to those of the first example of the configuration and does not include the CPU 4306 and the like. Therefore, advantageously, costs can be reduced and the display system can simplify its function and can reduce its price.

The third example of the configuration is described with reference to FIG. 22.

A signal format converter 4201a comprises: a TMDS receiver 4207; a GVIF transmitter circuit 4202; an EEPROM 4206 for storing the EDID dada; and a switch 4208 for switching on/off a power supply 4209. However, the signal format converter 4201a includes none of the DDC control unit 4203, CPU 4204, and RAM 4205.

The head mounted type display apparatus 4301a in the third example, with the same configuration as that of the second example shown in FIG. 21, includes the EEPROM 4308 for storing the EDID data, but none of the DDC control unit 4205, CPU 4306, and RAM 4307.

The EEPROMs 4206 and 4308 are different in their addresses. Therefore, via a DDC control line 4211, the host PC 4101a can read the contents of the EEPROMs 4206 and 4308 independently.

Further, driver software of the host PC 4101a optimizes the combination.

The host PC 4301a has a switch control unit 4104. The switch control unit 4104 controls the switch 4208 of the signal format converter 4201a, thereby limiting power supplied to the head mounted type display apparatus 4301a. Thus, the improper usage is prevented.

The third example of the configuration has substantially the same advantages as those of the second example. Since the signal format converter 4201a includes no CPU 4204 and the head mounted type display apparatus 4301a includes no CPU 4306, the third example can reduce more costs than the second embodiment.

Further, the fourth example of the configuration is described with reference to FIG. 23.

A host PC 4101*b* comprises an RGB output unit 4105 and a DDC control unit 4103. The RGB output unit 4105 outputs image data and a video timing signal. In this case, the output format is an analog RGB one.

Corresponding to the analog RGB format, the signal format converter 4201*b* has a function for converting an analog RGB signal into GVIF digital data.

More specifically, the signal format converter 4201*b* receives the image data and video timing signal which are transmitted by the host PC 4101*b*, an A/D converter 4210 converts the received data into the digital data, and the digital data is transmitted to the head mounted type display apparatus 4301 (refer to FIG. 19) via the GVIF transmitter circuit 4202.

In the signal format converter 4201*b*, components except for the A/D converter 4210 are structured and operated in the above manner of the first example.

The fourth example of the configuration has substantially the same advantages as those of the first example. In the fourth example, the analog RGB signal can be converted into the GVIF digital data.

As described above, according to the first to fourth examples, in the display system comprising the host PC, signal format converter, and display apparatus, the signal format converter itself also effects the plug and play mechanism and, therefore, the setting is simple and display apparatus can properly used.

Since the EDID data includes the data of power supply to the display apparatus, the power feed can be correctly determined and the inconvenience caused by the combination can be prevented when connecting various microdisplay apparatuses.

In this invention, it is apparent that various modifications in a wide range can be made on this basis of this invention without departing from the spirit and scope of the invention. This invention is not restricted by any specific embodiment except being limited by the appended claims.

What is claimed is:

1. A display system comprising:
    a host apparatus having an image output interface;
    a display apparatus which is operated by supply of at least one of a video signal and power from said host apparatus; and
    a communication interface for communicating data between said host apparatus and said display apparatus;
    wherein said display apparatus comprises:
        a storing section for storing power consumption data;
        a storing section for storing on-screen display information; and
        a display-side communication-section for transmitting said stored power consumption data and said on-screen display information;
    wherein said host apparatus comprises:
        a host-side communication section for receiving said power consumption data transmitted from said display apparatus and said on-screen display information;
        a power control section for entirely performing power control of said display system based on said power consumption data received from said host-side communication section; and
        an information superimposing section for superimposing said received on-screen display information on the video signal; and
    wherein the host-side communication section transmits the video signal having the on-screen display information superimposed thereon, the display-side communication section receives the transmitted signal, and the display apparatus displays an image of the on-screen display information.

2. A system according to claim 1, wherein:
    said host apparatus further comprises a first memory for storing on-screen display information thereof, and a second memory for storing the on-screen display information of said display apparatus which is received via said host-side communication section, and
    said information superimposing section converts the on-screen display information stored in at least one of said first memory and said second memory into indicatable bit map information, and superimposes the indicatable bit map information on the video signal.

3. A system according to claim 1, wherein said on-screen display information comprises ASCII text data.

4. A system according to claim 1, wherein said display apparatus is adapted to be selectively connected to a plurality of types of host apparatuses.

5. A system according to claim 1, wherein said host apparatus is adapted to be selectively connected to a plurality of types of display apparatuses.

6. A display system comprising:
    a host apparatus having an image output interface;
    a display apparatus which is operated by receiving at least a video signal from said host apparatus; and
    a communication interface for communicating data between said host apparatus and said display apparatus,
    wherein said display apparatus comprises a memory for storing on-screen display information, and a display-side communication section for transmitting the on-screen display information,
    wherein said host apparatus comprises a host-side communication section for receiving the on-screen display information transmitted by said display apparatus, and an information superimposing section for superimposing the received on-screen display information on the video signal, and
    wherein in said display system, said host-side communication section transmits the video signal having the on-screen display information superimposed thereon, said display-side communication section receives the transmitted signal, and said display apparatus displays an image of said on-screen display information.

7. A system according to claim 6, wherein said communication interface has a specification for communication between said host-side communication section and said display-side communication section which conforms with a DDC1/DDC2B/DDC2AB standard prescribed by Video Electronics Standards Association or an expansion function thereof.

8. A system according to claim 6, wherein said display apparatus includes a mode for operating only said communication interface for communication with said host apparatus.

9. A system according to claim 6, wherein said display apparatus further comprises an indicator lamp for alarm display.

10. A system according to claim 6, wherein:
    said host apparatus further comprises a first memory for storing on-screen display information thereof, and a second memory for storing the on-screen display information of said display apparatus which is received via said host-side communication section, and
    said information superimposing section converts the on-screen display information stored in at least one of said first memory and said second memory into indicatable bit map information, and superimposes the indicatable bit map information on the video signal.

11. A system according to claim 6, wherein said on-screen display information comprises ASCII text data.

12. A system according to claim 6, wherein said display apparatus is adapted to be selectively connected to a plurality of types of host apparatuses.

13. A system according to claim 6, wherein said host apparatus is adapted to be selectively connected to a plurality of types of display apparatuses.

14. A system according to claim 6, wherein the display apparatus comprises a microdisplay apparatus that is wearable by a user.

15. A system according to claim 6, wherein the display apparatus comprises a microdisplay apparatus that is wearable on at least one of a head and face of a user.

16. A method for controlling a display system including a host apparatus and a display apparatus, said method comprising:
  supplying at least a video signal from the host apparatus to the display apparatus to operate the display apparatus;
  transmitting on-screen display information stored in the display apparatus from the display apparatus to the host apparatus;
  superimposing, at the host apparatus, the on-screen display information received by the host apparatus onto the video signal that is supplied from the host apparatus to the display apparatus; and
  displaying an image of the on-screen display information on the display apparatus based on the video signal having the on-screen display information superimposed thereon.

* * * * *